United States Patent [19]
Hess et al.

[11] Patent Number: 5,590,315
[45] Date of Patent: Dec. 31, 1996

[54] METHOD AND APPARATUS FOR SIMULATING USER INPUT DEVICE PRESENCE IN A COMPUTER SYSTEM

[75] Inventors: Randall L. Hess, Cypress; Drew S. Johnson, Houston, both of Tex.

[73] Assignee: Compaq Computer Corporation, Houston, Tex.

[21] Appl. No.: 359,014

[22] Filed: Dec. 19, 1994

Related U.S. Application Data

[63] Continuation of Ser. No. 119,430, Sep. 10, 1993, abandoned.

[51] Int. Cl.$^6$ .......................................... G06F 3/00
[52] U.S. Cl. ...................... 395/500; 364/236.8; 364/234
[58] Field of Search ................................................ 395/500

[56] References Cited

U.S. PATENT DOCUMENTS

| | | | |
|---|---|---|---|
| 3,810,120 | 5/1974 | Huehner et al. | 395/275 |
| 4,819,205 | 4/1989 | McRoberts | 365/1 |
| 5,034,598 | 7/1991 | Poland | 235/435 |
| 5,056,001 | 10/1991 | Sexton | 395/275 |
| 5,241,680 | 8/1993 | Cole et al. | 395/750 |
| 5,345,347 | 9/1994 | Hopkins et al. | 360/71 |

FOREIGN PATENT DOCUMENTS

| | | | |
|---|---|---|---|
| 531635 | 6/1992 | European Pat. Off. | |
| 4102952 | 4/1992 | Japan | G06F 13/10 |
| 4235655 | 8/1992 | Japan | G06F 13/14 |

OTHER PUBLICATIONS

IBM Technical Disclosure Bulletin: Keyboard–Less Peronal Computer, vol. 31, No. 12 (May 1989).

IBM Technical Disclosure Bulletion: Keyboard Simulator Circuit, vol. 32, No. 5B (Oct. 1989).

IBM Technical Disclosure Bulletin: Auxiliary Device Connector for Notebook PC, vol. 36, No. 3 (Mar. 1993).

IBM Technical Disclosure Bulletin: Method of Reducing Software Complexity in Pointing Device and/or Keyboard Simulation, vol. 35, No. 2 (Jul. 1992).

IBM Technical Disclosure Bulletin vol. 33 No. 12 May 1991 pp. 289–292.

*Technical Reference Guide*, Compaq Deskpro 386/25 Personal Computer, vol. II, pp. 5–1 to 5–36.

*Primary Examiner*—Krisna Lim
*Attorney, Agent, or Firm*—Pravel, Hewitt, Kimball & Krieger

[57] ABSTRACT

A computer system which provides emulation routines that cause a keyboard or mouse to appear present to the system software even when the devices are not physically installed. On system start up, this allows installation of appropriate device drivers by the operating system. If a keyboard or mouse is later installed, the emulation responses are discontinued, and a keyboard and mouse operate normally. When the system is placed in a standby state, the keyboard and mouse connectors are totally powered down. Before this power down, the BIOS routines save the configuration state of the keyboard and mouse as recorded by the emulation routines, which have been tracking commands sent to those devices even when those devices are operating. When power is reenabled to the keyboard and mouse connectors, the configuration of those devices is restored from that saved configuration data. Further, the system detects whether a keyboard or mouse is installed on a particular connector, and appropriately maps the keyboard and auxiliary ports to correspond to that connector.

13 Claims, 20 Drawing Sheets

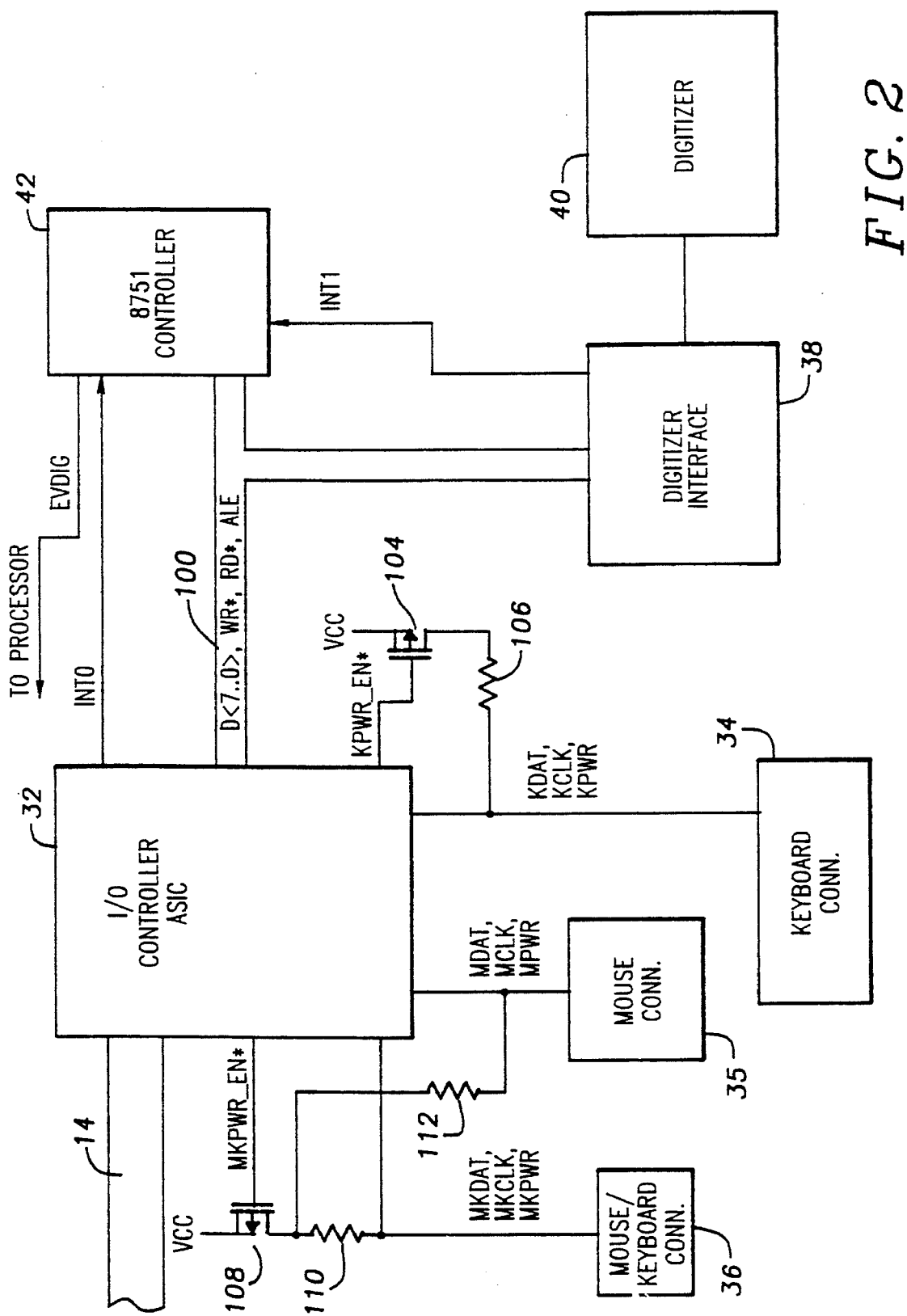

METHOD AND APPARATUS FOR SIMULATING USER INPUT DEVICE PRESENCE IN A COMPUTER SYSTEM

This is a continuation of application Ser. No. 08/119,430 filed on Sep. 10, 1993 now abandoned.

BACKGROUND OF THE INVENTION

1. Field of the Invention

The invention relates to personal computers with connections for keyboards and auxiliary device, and more particular to personal computers that operate in a reduced power mode in which the keyboard and auxiliary device can be both disabled and removed from their connections.

2. Description of the Related Art

Personal computers compatible with the International Business Machines Corp. (IBM) PC/AT and its progeny have historically provided both physical and software interfaces for a keyboard and an auxiliary device. These interfaces are now standardized, and any IBM compatible machine must implement such keyboard and auxiliary serial interfaces using standard I/O ports and providing a standard command and data interface for those I/O ports. This software and hardware interface has historically been provided in IBM PC compatible systems by an 8042 peripheral controller by Intel Corp., programmed to direct communication to and from either a keyboard connector or an auxiliary connector. This 8042 command structure standard is well known in the art and is further described in the Compaq DeskPro 386S Personal Computer Technical Reference Guide.

Keyboard and auxiliary devices designed to operate with an IBM compatible personal computer likewise have standardized communications formats for both data and commands. The standard data and command structure for an IBM compatible keyboard can be found in the Compaq DeskPro 386S Personal Computer Technical Reference Guide in Chapter 11. Pointing devices, such as mice and trackballs, are often used as the auxiliary device of choice. A standard for a serial mouse typically used as an auxiliary device is that used by the IBM PS/2 mouse. The specifications can be found in Appendix A.

The standardization of the keyboard and mouse command sets has allowed third party manufacturers to design and market keyboards and mice that can be directly connected to an IBM compatible personal computer and immediately function properly. The standardization of the personal computer hardware and firmware has allowed software developers to communicate with these devices in a standardized way, without the need to patch their programs for different system communications hardware.

These standardized interfaces and standardized devices, however, do include limitations that have become especially apparent during the current proliferation of portable, laptop, notebook, and notepad style computers. The original IBM personal computer was a desktop-based machine, and the software and hardware developers could presume any keyboard or mouse would already be attached to the system at the time the system was turned on. With the new breed of portable computers, however, a keyboard and mouse are preferably detachable to allow for stand alone operation of the computer, and further to allow rearranging of the keyboard and mouse by attaching them to different locations, such as when the portable computer user connects their computer to a desktop expansion base.

Connection and disconnection of these devices, however, results in certain difficulties for the operating system BIOS and application software. When a standard system is first turned on, the power on self-test (POST) and initialization routines send certain commands to the keyboard and auxiliary communication ports and look for specific responses to determine if a keyboard or auxiliary device is attached to the system. If a response is detected, the POST and initialization routines load appropriate device drivers; if no such response is detected, however, the routines omit such drivers. This reduces memory usage in desktop machines that do not have an attached keyboard or auxiliary device.

Standard system software, however, cannot dynamically add device drivers for devices subsequently attached to the system, unless special commands are executed, which require additional user actions. Thus, if a laptop user turns on the machine without such devices attached, standard system software will fail to load the appropriate device drivers. If such devices are subsequently attached, the user will have no way to communicate with or otherwise use those devices, without extra and often obscure procedures.

Further, if the driver software is loaded, subsequently disconnecting the keyboard or auxiliary device often causes the system software to lock up. This is because the software enters an infinite loop, waiting for responses from those devices; responses which will never come.

Power considerations in laptops also make it desirable to totally disable the power to an attached keyboard or auxiliary device. A keyboard or auxiliary device is normally deactivated by pulling its clock or data line low. This method of deactivation, however, is not power efficient, as the 5 volt supply to the keyboard or auxiliary device is then drained through a pull-up resistor. Thus, it is desirable to totally cut the power to an attached keyboard or device when in a power savings mode, as this prevents power consumption by the pull up resistor.

Cutting off all power to such a device, however, causes the internal controller on that device to lose all of its configuration data stored in its random access memory. When the device is again powered on, it will not contain the configuration state as previously set up by the system or the application software. Further, when the power to the keyboard or auxiliary device is disabled, to the system it will appear the device has been "unplugged", causing the attendant lock-up problems mentioned above.

It would be desirable to force the loading of device drivers during the POST and initialization routines whether or not a keyboard or auxiliary device is attached to its associated connector, to prevent system lock up if a keyboard or auxiliary device is removed during system operation, and to totally disable power to a keyboard or auxiliary device when in a power savings mode without losing the current configuration information for such a keyboard auxiliary device.

SUMMARY OF THE INVENTION

A computer system constructed according to the invention provides keyboard and auxiliary device emulation routines that effectively cause the system or application software to detect an attached keyboard or auxiliary device even when that device is physically not attached to the system or when the power to such a keyboard or auxiliary device is disabled. These routines, implemented in keyboard and auxiliary device interface controller hardware, provide appropriate responses to commands the system directs to a keyboard or auxiliary device.

Further, these emulation routines capture configuration commands sent to a keyboard or auxiliary device, and store associated configuration information. The system or application software can then retrieve this information before disabling the device. When a keyboard or a auxiliary device is disabled, either by being detached or by being powered down, the keyboard and auxiliary device configuration is first obtained by the system and is later restored.

The system obtains and stores this configuration data when it enters a power saving stand-by state. When the system exits this stand-by state, it reconfigures any attached keyboard and auxiliary device based on the previously retrieved and stored configuration data. Even if no keyboard or auxiliary device is attached, the system sends the same reconfiguration commands as would usually be sent to the keyboard or auxiliary device, and these are then captured and responded to by the emulation routines, which store this configuration data for the next power down sequence.

Even if these devices are attached, the configuration commands are passed through the emulation routines so that they can save this configuration data. With devices installed, however, the responses to the configuration commands come from the devices themselves rather than the emulation routines.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram further showing a system in which the invention is typically implemented;

DETAILED DESCRIPTION OF THE PREFERRED EMBODIMENTS

Figure 1:
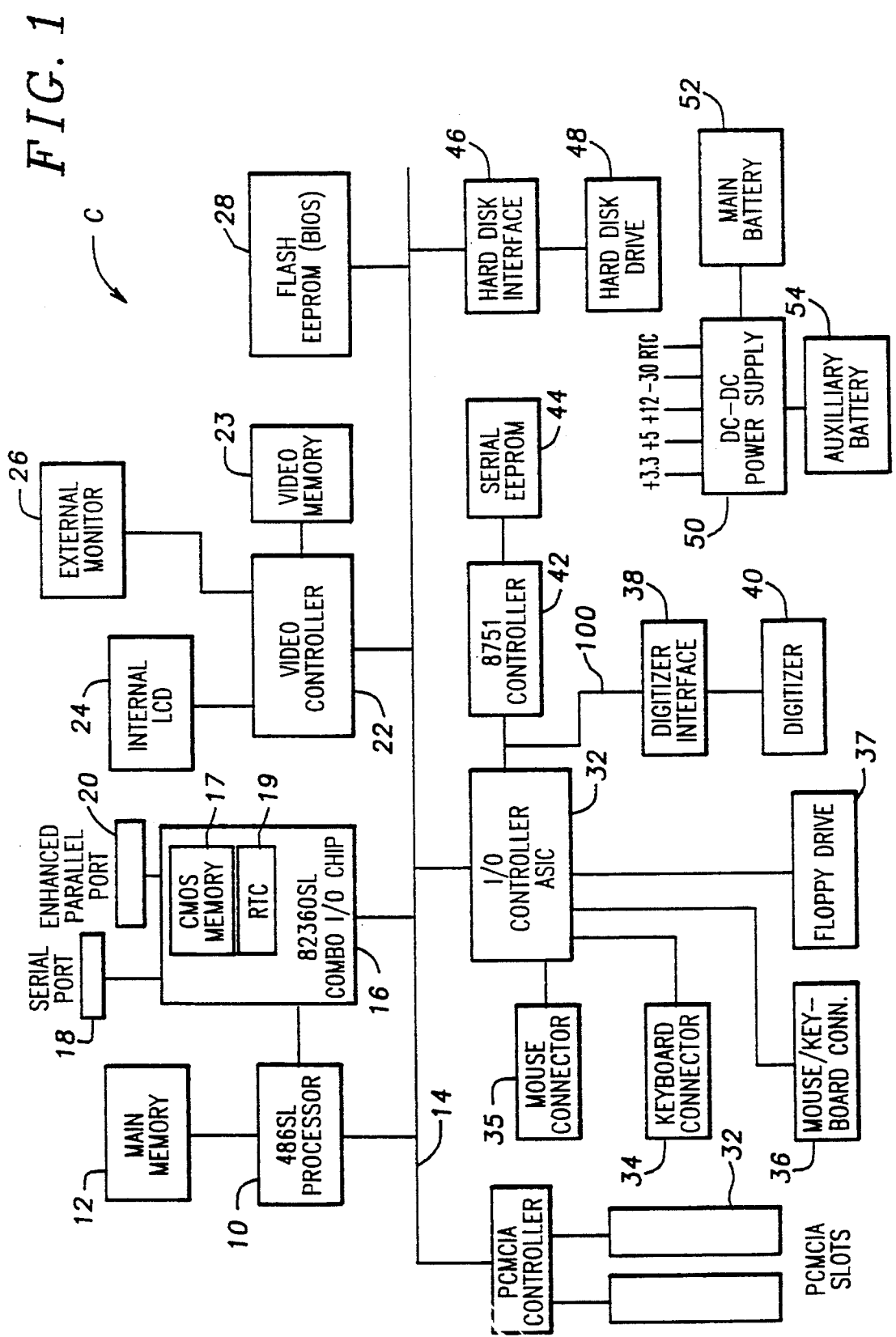
FIG. 1 is a block diagram of a computer system in which the apparatus and method according to the invention could be implemented.

Proceeding now to FIG. 1, a computer C according to the present invention is shown. A microprocessor 10, preferably the 486SL processor from Intel Corporation (Intel), forms the main computing element of the computer C. Main memory 12 is connected to the processor 10 over a memory bus. A bus 14 is connected to the processor 10 and includes address, data and control portions to form a main communication bus to the various components in the computer C. One such component is a combination I/O chip 16, preferably the 82360SL from Intel. A separate connection preferably is made between the processor 10 and the combo I/O chip 16 to provide the special connections between the 486SL and the 82360SL. A serial port 18 and an enhanced parallel port 20 are provided from the combo I/O chip 16. A video controller 22 is connected to the bus 14 to receive commands from the processor 10 and video memory 23 is connected to the video controller 27. An internal liquid crystal (LCD) display 24 is connected to the video controller 22 and in certain cases an external monitor 26, typically a CRT, can be connected to the video controller 22 as desired.

As the computer C must contain certain basic operating routines to allow the computer to boot and to perform certain fundamental system functions, these routines being generically referred to as the BIOS, a flash EEPROM 28 is connected to the bus 14 to contain these routines. This could instead be a standard ROM. Not shown for clarity are the necessary connections to allow programming and erasing to occur as these are well known to those skilled in the art. A PCMCIA controller 30 is connected to the bus 14 and in turn has two PCMCIA slots 32 connected to it. The PCMCIA slots 32 provide expansion capabilities for the computer C to provide additional memory if desired or to receive certain communications options, such as modems and network cards.

An I/O controller application specific integrated circuit (ASIC) 32 is connected to the bus 14. The I/O controller ASIC 32 provides numerous special functions in the computer C. The I/O controller ASIC 32 contains the necessary shift registers and clock logic to allow connection of a mouse or other pointing device to a mouse connector 35, a keyboard to a keyboard connector 34, and a mouse or other pointing device or a keyboard to a mouse/keyboard connector 36. The I/O controller ASIC 32 further contains the necessary hardware to route a logical keyboard port P_KBD and auxiliary port P_AUX to two of these three physical connectors.

In addition, the I/O controller ASIC 32 contains the necessary interfaces to connect to a floppy drive 37 and to a digitizer interface 38. The digitizer interface 38 is in turn connected to a digitizer 40 to allow pen input information to be utilized in the computer C. The I/O controller ASIC 32 also preferably includes various registers to allow it to be used in combination with an 8051 or 8751 microcontroller 42. This is preferably an 8751FB microcontroller from Intel Corp., as that microcontroller responds to interrupts even when it is in a standby state. When used with an 8751 controller 42, the I/O controller ASIC 32 appears to the processor 10 as an 8042-type microcontroller as commonly used as a keyboard and auxiliary device controller in a conventional desktop personal computer. Thus the I/O controller ASIC 32 contains certain elements to mimic the register set and which are accessible by the 8751 controller 42. In this manner the 8751 controller 42 need not perform many of the actual conventional 8042 keyboard controller low level functions, such as the keyboard and aux port serial communications, as these functions are done in the I/O controller ASIC 32 to relieve the burdens on the 8751 controller 42.

The 8751 controller 42 is connected to a serial EEPROM 44. Preferably the serial EEPROM 44 is small but still contains enough space for an entire copy of the data in the CMOS memory 17 which is contained in the combo I/O chip 16. Preferably the serial EEPROM 44 contains 128 16 bit storage locations, each location being individually addressable and erasable. The 8751 controller 42 is properly connected to the serial EEPROM 44 according to the manufacturer's instructions to allow programming and serial communication of data. For a more detailed description of this configuration, please refer to Ser. No. 08/119,691, entitled PERSONAL COMPUTER WITH CMOS MEMORY NOT HAVING A SEPARATE BATTERY, which is filed currently herewith and which is hereby incorporated by reference.

A hard disk interface 46 is also connected to the bus 14 to allow the processor 10 to interface with a hard disk drive 48 for mass storage.

The computer C also includes a power supply. A DC/DC power supply 50 provides the necessary voltages used in the computer C, such as +3.3, +5, +12, -30 and a voltage provided to the CMOS memory 17 and the RTC 19. The CMOS/RTC voltage is provided separately to allow the remaining components of the computer C to be powered off to allow the computer C to be placed in a very low power standby condition. The DC/DC power supply 50 is connected to a main battery 52 of the computer C and a small auxiliary battery 54.

Turning to FIG. 2, that figure is a block diagram showing further details of the I/O controller ASIC 32, the keyboard connector 34, the mouse connector 35, the mouse/keyboard connector 36, the digitizer interface 38, the digitizer 40, and the 8751 controller 42. The I/O controller ASIC 32, the 8751 controller 42, and the digitizer interface 38 are interconnected by a controller bus 100, which carries, among other signals, address data/signals AD<7..0>, active low read and write signals WR* and RD*, and an address latch enable signal ALE, which latches an address onto AD<7..0>, as opposed to a data byte. Further, the 8751 controller 42 receives its zero interrupt signal INT0 from the I/O controller ASIC 32, and receives its one interrupt signal INT1 from the digitizer interface 38. The 8751 controller 42 also provides a digitizer event signal EVDIG to the processor 10. That signal is provided to the processor 10 preferably through glue circuitry not shown, or possibly through the combination I/O chip 16.

The signals in the 8751 controller 42 conform to the 8751 specification, which can be found in 8-bit *Embedded Controllers*, Copyright 1990, by Intel Corp. The 8751 controller 42 provides for external memory accesses. Preferably, the I/O controller ASIC 32 and the digitizer interface 38 contain memory mapped I/O registers that the 8751 controller accesses as though they were external memory. The controller bus 100 provides for accesses to these memory mapped I/O ports, and through these ports the 8751 controller 42 communicates the with the I/O controller ASIC 32 and the digitizer interface 38.

The I/O controller ASIC 32 is connected to the mouse connector 35, which is used to interface with a mouse through a serial data line MDAT, a serial clock line MCLK, and a serial power line MPWR. Corresponding signals KDAT, KCLK and KPWR are provided for the keyboard connector 34. Additionally, the I/O controller ASIC 32 is connected to the mouse/keyboard connector 36, again through corresponding signals MKDAT, MKCLK and MKPWR. The function of this added interface will become apparent in the discussion of FIGS. 3A–3C below.

In this discussion, the auxiliary device is referred to as being a mouse, preferably with a command and data structure compatible with an IBM PS/2 mouse. Other compatible pointing devices, such as trackballs, or other types of auxiliary devices could instead be used without departing from the spirit of the invention.

The I/O controller ASIC 32 also provides an active low keyboard power enable signal KPWR_EN*, which drives the gate of a FET 104. The drain of the FET is connected to VCC, which is preferably 5 volts, and the source of the FET is connected to KDAT, KCLK, and KPWR through a series of resistors, shown as a single resistor 106 for simplicity. Similar circuitry is provided for the mouse connector 35 and the mouse/keyboard connector 36, with a signal MKPWR_EN* being provided by the I/O controller ASIC 32 to a FET 108, which connects to MKDAT, MKCLK, MKPWR through a series of resistors shown as a resistor 110, and to the MDAT, MCLK, and MPWR through a series resistor shown as a resistor 112. The circuitry preferably used to implement these resistors is further described in the discussion of FIG. 3B, below.

Serial communications with the mouse/keyboard connector 36, with the mouse connector 35, and with the keyboard connector 34 are directly carried out in hardware by the I/O controller ASIC 32. The 8751 controller 42, however, provides the logical communications with devices connected to those connectors, interfacing to them by providing and receiving commands and data over the controller bus 100. When the 8751 controller 42 wishes to communicate with these devices, it sends to and receives from the I/O controller ASIC 32 commands and data in the form of parallel command and data bytes at memory mapped external I/O addresses. The I/O controller ASIC 32 then serializes the data to or from the devices and handles the serial communication link with those devices. Further, the I/O controller ASIC 32 similarly receives commands from the 8751 controller 42 regarding the activation and deactivation of MKPWR_EN* and KPWR_EN*. Communications between the processor 10 and the 8751 controller 42 are handled by mailbox registers in the I/O controller ASIC 32 implemented as memory mapped I/O ports to the 8751 controller 42.

Figure 3A:
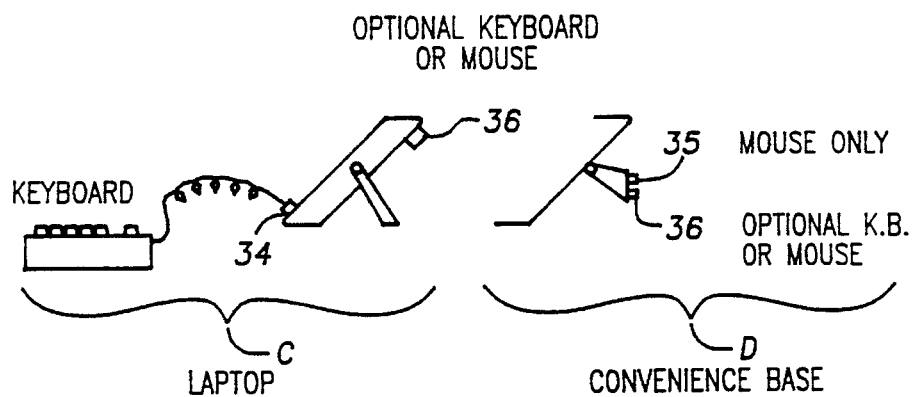
FIGS. 3A, 3B and 3C show further details of the physical and logical data paths of the keyboard and auxiliary device connections according to the invention.
Figure 3B:
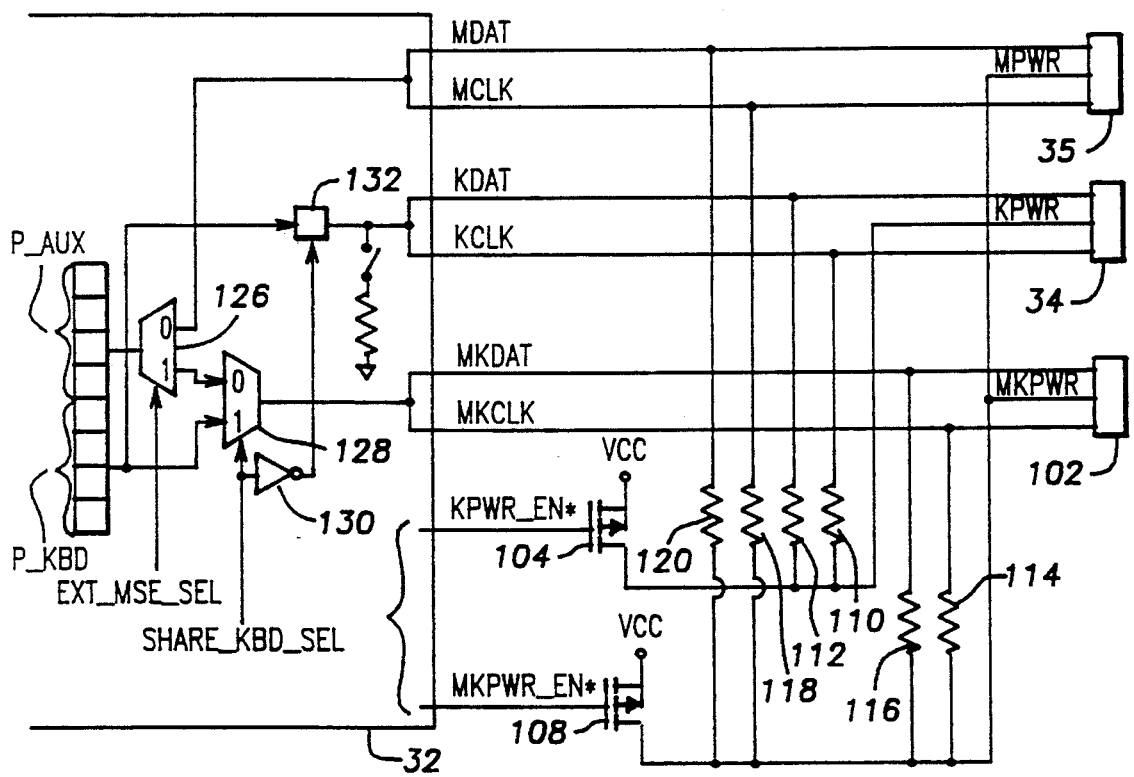
Figure 3C:
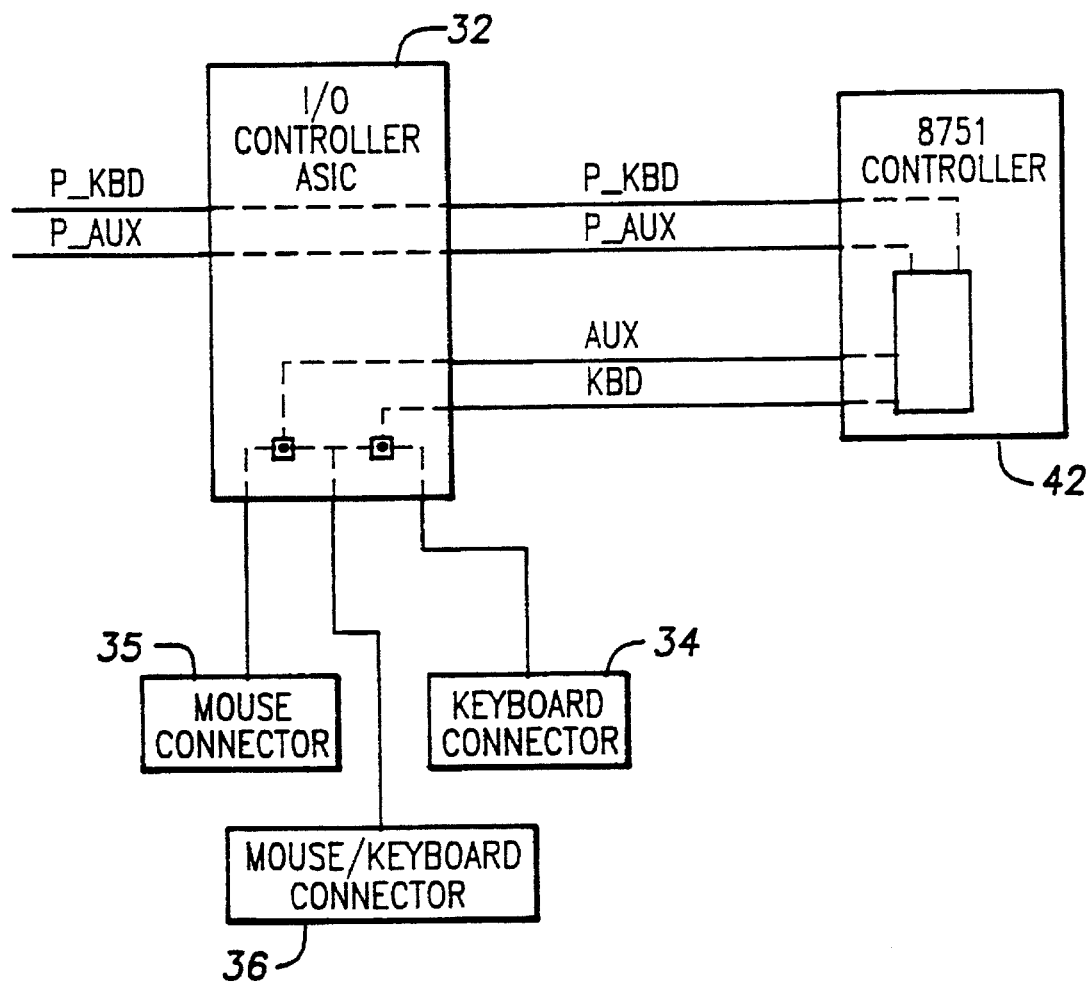

FIGS. 3A–3C show further details of the implementation of the mouse/keyboard connector 36, the mouse connector 35, and the keyboard connector 34. FIG. 3A shows the physical setup of the computer C along with a convenience base D. When the computer C is operated in a stand alone mode, a keyboard can be connected to the keyboard connector 34 or to the mouse/keyboard connector 36. If the keyboard is connected to the keyboard connector 34, then a mouse can be connected to the mouse/keyboard connector 36.

When the computer C is connected to the convenience base D, a keyboard can still be connected to the keyboard connector 34, or could instead be connected to the mouse/keyboard connector 36 on the convenience base D. Further, a mouse can be connected to the mouse connector 35 on the convenience base D.

Standard system software in the BIOS communicates with a keyboard and auxiliary device through I/O ports P_KBD and P_AUX. P_KBD and P_AUX correspond to keyboard and auxiliary communication ports implemented in a standard 8042 in an IBM PC compatible computer. The 8751 controller 42 performs the functions of an 8042, responding to the 8042 command set as implemented in an IBM compatible PC. P_KBD and P_AUX are not technically actual I/O ports implemented as I/O addresses, but rather represent communications to the 8751 controller 42 that cause data and commands to be written to and read from a corresponding attached keyboard or auxiliary device connector. In a standard 8042 implementation in an IBM compatible personal computer, such communications are performed by the BIOS sending a command to I/O port address 64h, followed by sending data to I/O port 60h. A specific bit in the command byte directs the data to either the keyboard device or the auxiliary device. Conversely, data from one of these devices is read from port 60h, and the source of that data is determined by reading the status byte from port 64h. Thus, the "ports" P_KBD and P_AUX are simply a shorthand for an appropriate series of commands and data sent to or status and data bytes read from the "8042

" as implemented in the 8051 controller 42. These commands are well known in the art and are further described in the Compaq Deskpro 386S Personal Computer Technical Reference Guide, referenced above.

To maintain a logical keyboard port P_KBD and a logical auxiliary port P_AUX as being connected to a keyboard or a mouse device, the system must route these signals depending on which connectors those devices are connected to. This is also handled in the I/O controller ASIC 32. FIG. 3B is a schematic/block diagram showing the hardware used to make this connection. The mouse connector 35 communicates with the I/O controller ASIC 32 over MDAT and MCLK, the keyboard connector 34 communicates with the I/O controller ASIC 32 over KDAT and KCLK, and the mouse/keyboard connector 36 communicates with the I/O controller ASIC 32 over MKDAT and MKCLK.

The physical routing between the mouse connector 35, the keyboard connector 34, and the mouse/keyboard connector 36 and the system I/O ports P_AUX and P_KBD are provided by circuitry internal to the I/O controller ASIC 32. A multiplexor 126 directs communications from an auxiliary register AUX in the I/O connector ASIC 32 to the mouse connector 35 when a select signal EXT_MSE_SEL is low. When that signal is high, communications through AUX are directed instead to a second multiplexor 128. The other input to this multiplexor 128 is connected to a keyboard register KBD. When a signal SHRE_KBD_SEL is low, the output of the multiplexor 126 is coupled to the mouse/keyboard connector 36. When that signal is high, KBD is instead coupled to the mouse/keyboard connector 36. An inverter 130 provides the inverted signal SHRE_KBD_SEL to buffers 132, which then connect KBD with the keyboard connector 34.

It will be recognized that the multiplexors 126 and 128 are logical blocks rather than actual physical multiplexors. This is because the "multiplexors" must handle bidirectional communications directed to the mouse connector 35, the keyboard connector 34, and the mouse/keyboard connector 36. Further, other circuitry in the I/O controller ASIC 32 must handle the serial to parallel conversion and parallel to serial conversion of the data between those connectors and KBD and AUX. That data is then communicated as parallel data between KBD and AUX and the 8751 controller via the controller bus 100.

By properly configuring EXT_MSC_SEL and SHRE_KBD_SEL, the I/O controller ASIC 32 thus couples AUX with either the mouse connector 35 or the mouse/keyboard connector 36. Similarly, the I/O controller 32 couples KBD with either the keyboard connector 34 or the mouse/keyboard connector 36. EXT_MSC_SEL and SHRE_KBD_SEL are provided by the 8751 controller 42 over the controller bus 100, and are implemented in a memory mapped I/O register.

Further provided by the 8751 controller 42 through a memory mapped I/O register are KPWP_EN* and MKPWR_EN*. These registers totally enable or disable power to the three connectors. KPWR_EN*, when asserted low, turns on the FET 104, providing power to KPWR and pulling up KDAT and KCLK through resistors 111 and 113. These resistors 111 and 113 correspond to the resistor 106 of FIG. 2.

MKPWR_EN*, when asserted low, connects VCC to MKPWR and MPWR, and also pulls up MKDAT and MKCLK through resistors 114 and 116, corresponding to the resistor 110 of FIG. 2, and pulls up MDAT and MCLK through resistors 118 and 120, corresponding to resistor 112 of FIG. 2. Resistors 111–120 are preferably approximately 2.2 kΩ.

FIG. 3C provides the logical relationships and the I/O communications data flow between the processor 10, the I/O controller ASIC 32, the 8751 controller 42, and the mouse connector 35, the mouse/keyboard connector 36, and the keyboard connector 34. As discussed above, "8042" style commands and data are communicated between the processor 10 and the I/O controller ASIC 32, and then passed on through mailbox registers to the 8751 controller 42.

Using the 8042-style communications interface, the processor 10 sends and receives command and data characters via the standard "ports" P_KBD and P_AUX. Thus, when the processor 10 executes a series of commands generally directed either to an attached keyboard device in a standard IBM PC system or an attached auxiliary device in an IBM PC system, the 8751 controller 42 then processes those commands and data characters directed to P_AUX and P_KBD, and, as is discussed below, if in emulation mode, returns an appropriate response over P_KBD or P_AUX. If not in emulation mode, the 8751 controller 42 traps any configuration command characters and associated data characters and stores that configuration data and further communicates the configuration command and data characters to an auxiliary device through the auxiliary register AUX or the keyboard through the keyboard register KBD, both in the I/O controller ASIC 32. Then, as discussed above in conjunction with FIG. 3B, these registers route that data to the appropriate connector, with AUX being routed to either the mouse connector 35 or the mouse/keyboard connector 36, and KBD being routed to either the keyboard connector 34 or the mouse/keyboard connector 36.

FIGS. 5–13 are flowcharts of routines in the system BIOS the system C executes when it sleeps or wakes up, which corresponds to entering and exiting a reduced power standby mode. These routines save and restore the state of any connected keyboard or mouse, or the state of the emulated keyboard and mouse if none is connected, and also configure the routing of commands directed through P_KBD or P_AUX through the I/O controller ASIC 32 and the 8751 controller 42.

The system sleeps and wakes up in response to various events regarding system activity, such as user input and certain timeouts. For example, if the system C does not detect hard disk or input device activity for a predetermined amount of time, a system management interrupt based on a timeout typically causes the system to go into a standby, reduced power consumption mode.

Figure 4:
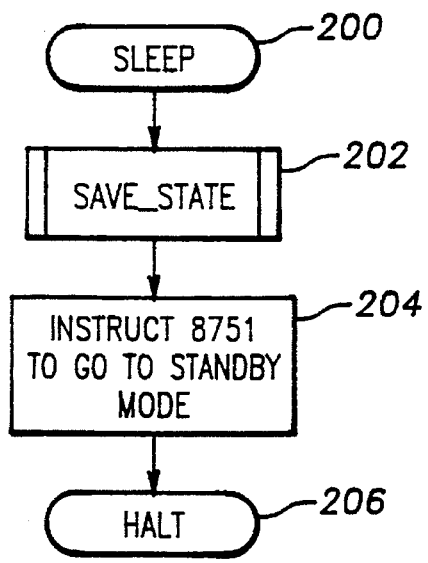
FIGS. 4, 5, 6, 7, 8, 9, 10, 11, 12, and 13 are flowcharts of software implemented in the system BIOS according to the invention.

On entering this standby mode, the BIOS routines execute a SLEEP routine 200, as shown in FIG. 4. The SLEEP routine 200 begins at step 202 by calling a SAVE_STATE routine 207, discussed below in conjunction with FIG. 5, which saves the configuration state of any attached or emulated keyboard or mouse.

Once the state of the keyboard and mouse are saved, the SLEEP routine 200 proceeds to step 204, where it instructs the 8751 controller 42 to enter standby mode. This mode is a reduced power consumption mode in which the 8751 controller 42 uses very little power. Then, at step 206 the system C halts, going into reduced power consumption mode itself. It is noted that the system C itself does not lose the data contained in its memory 12.

Alternatively, the SLEEP routine 200 can cause the 8751 controller 42 to go into a hibernation mode. The computer C would enter this mode to further reduce power consumption, but this mode requires more time for a restart. The SLEEP routine causes the 8751 controller 42 to enter this mode by shutting off power to the 8751 controller 42 by commands to the combo I/O chip 16. The hibernation mode, however, causes the erasure of all of the memory in 8751 controller 42. This was one reason for executing the save state procedure at step 202.

Figure 5:
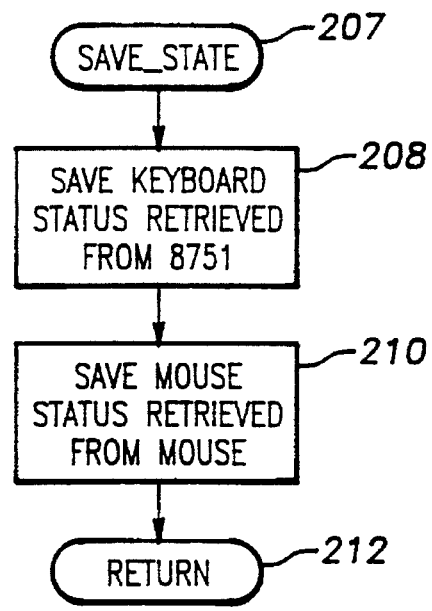

FIG. 5 shows a flowchart of the SAVE_STATE routine 207. The SAVE_STATE routine 207 begins at step 208, where the system C retrieves and saves in main memory 12 the keyboard status of the 8751 controller 42. This is done by directing a special, extended command to the 8751 controller 42. As mentioned above, the 8751 controller 42 includes the functionality of a standard 8042 as implemented in standard IBM PC compatible systems. It responds to certain commands issued to port 64h by the processor 10 as is well known in the DOS world. This command set is extended according to the invention by adding an extended command instruction, which is then followed by one of a number of other commands. These commands include enabling and disabling keyboard or mouse emulation, which is discussed below in conjunction with FIGS. 14–18D, reading and writing power supply status, turning off power, and, as is used here, retrieving the keyboard state.

There is no direct command character to a PC compatible keyboard for retrieving its current configuration. Instead, the keyboard emulation routine in the 8751 controller 42, which is discussed below in conjunction with FIGS. 17A–17D, saves a map of the current keyboard configuration as command characters altering that configuration are passed to the keyboard. The emulation routine does so whether or not a keyboard is attached. This state is then retrieved by sending an expanded command to the 8751 controller 42. This configuration state includes data reflecting which keyboard LEDs are on, whether the keyboard is enabled, and the current keyboard mode. Again, this is discussed below in conjunction with FIGS. 17A–17D.

Once the SAVE_STATE routine 207 has retrieved and saved the keyboard configuration in step 208, the SAVE_STATE routine 207 proceeds to step 210, where it retrieves and saves the corresponding mouse configuration retrieved from the mouse. A standard PS/2 mouse responds to a special command character by sending its internal status, or configuration. Thus, when the system C sends this special command character to P_AUX, either the mouse responds by sending its configuration through P_AUX to the processor 10, or the mouse emulation routine in the 8751 controller 42, discussed below in conjunction with FIGS. 18A–18D, responds with corresponding mouse configuration data. Also at step 210 a mouse present flag is saved, indicating whether a mouse did in fact return its configuration data. Because mouse emulation capability is preferably always enabled in the computer C, this flag should always be set true; the system C always "sees" a mouse, whether real or emulated. Only if mouse emulation were disabled would the flag be set false. After the system C has saved the configuration data, the SAVE_STATE routine 207 proceeds to step 212, where it returns to the SLEEP routine 200.

Figure 6:
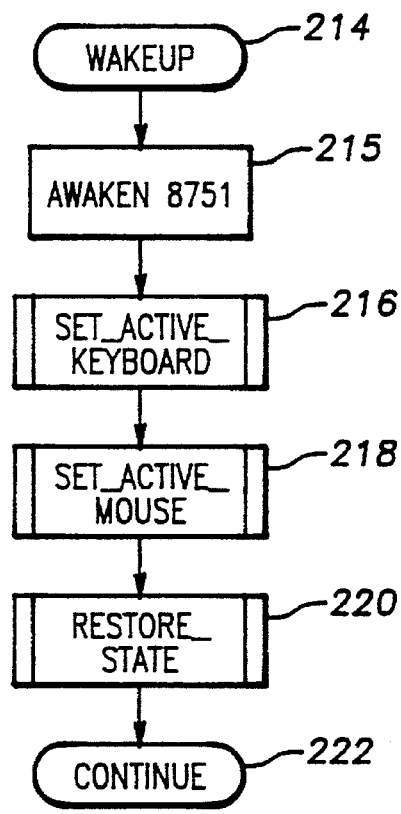

FIG. 6 is a flowchart of a WAKE_UP routine 214. The WAKE_UP routine 214 is executed as part of the system management routine when the system management software receives an activity or wake-up indication that the system C should exit its standby mode. The WAKE_UP routine 214 begins at 215, where it awakens the 8751 controller 42. If the 8751 controller 42 was only placed in standby mode at step 204, this entails sending a not-instandby flag to the 8751 controller 42 through an I/O controller ASIC 32 mailbox register, which awakens the 8751 controller 42 via INTO and instructs it to perform its wakeup procedures. If the 8751 controller 42 was placed in hibernation mode, however, it must be powered up through the combo I/O chip 16 and then its memory state restored.

The SAVE_STATE routine 207 then proceeds to step 216, where it executes a SET_ACTIVE_KEYBOARD routine 223, which provides data to the I/O controller ASIC 32 setting up the routing of AUX and KBD. This routes KBD to the correct physical connector, either the keyboard connector 34 or the mouse/keyboard connector 36. The SET_ACTIVE_KEYBOARD routine 223 is further discussed below in conjunction with FIG. 7. After routing the active keyboard in step 216, the WAKE_UP routine 214 then executes a SET_ACTIVE_MOUSE routine 280. Like the SET_ACTIVE_KEYBOARD routine 223, the SET_ACTIVE_MOUSE routine 280 routes AUX to either the mouse connector 35 or the mouse/keyboard connector 36. The SET_ACTIVE_MOUSE routine 280 is further discussed below in conjunction with FIG. 9.

After routing the active mouse at step 218, the WAKE_UP routine 214 then executes a RESTORE_STATE routine 220, further discussed below in conjunction with FIG. 11, which retrieves the data saved at steps 208 and 210 in FIG. 5, and configures any attached mouse and keyboard, and their corresponding emulation routines in the 8051 controller 42, to their state before the last stand-by mode was entered.

After restoring the mouse and keyboard state in step 220, the WAKE_UP routine 214 proceeds to step 222, where it continues with other system management routines related to waking up from standby.

Figure 7:
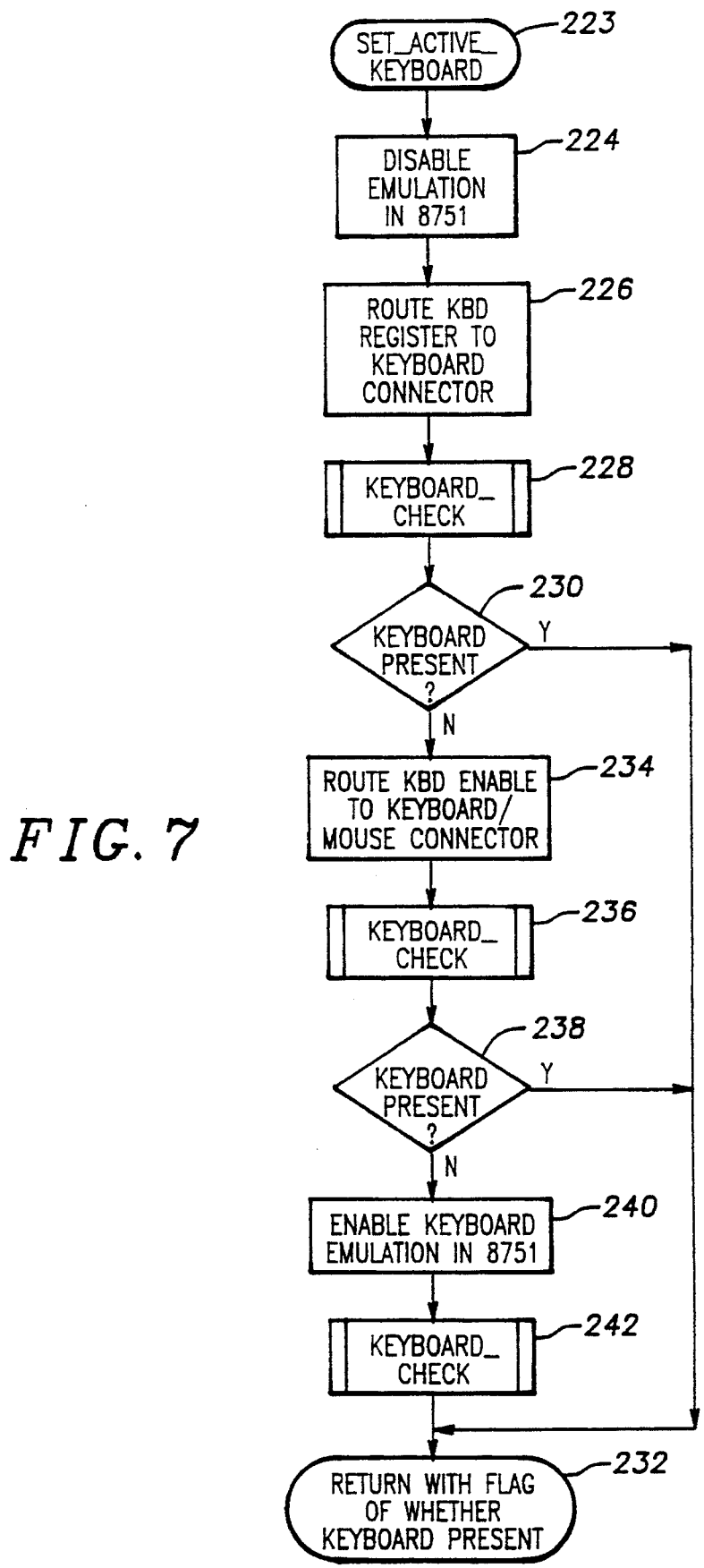

FIG. 7 is a flowchart of the SET_ACTIVE_KEYBOARD routine 223. Beginning at step 224, the SET_ACTIVE_KEYBOARD routine 223 first disables keyboard emulation in the 8751 controller 42 of responses to keyboard command characters sent to P_KBD. This is done by sending an expanded command to the 8751 controller 42 as discussed above. This prevents the 8751 controller 42 from providing emulated responses from a keyboard if a keyboard is not responding, thus allowing the SET_ACTIVE_KEYBOARD routine 223 to directly determine whether a keyboard is physically connected to either the keyboard connector 34 or the mouse/keyboard connector 36.

After disabling keyboard emulation in step 224, the SET_ACTIVE_KEYBOARD routine 223 proceeds to step 226, where it routes KBD to the keyboard connector 34. It does so by writing to an arbitrary port in the I/O controller ASIC 32, setting EXT_MSE_SEL low and SHRE_KBD_SEL low. This causes all communications through P_KBD, and hence through KBD, to be directed to the keyboard connector 34.

After making this connection, the SET_ACT_KBD routine 223 proceeds to step 228 and executes a KEYBOARD_CHECK routine 250. The KEYBOARD_CHECK routine 250, discussed below in conjunction with FIG. 8, returns a parameter indicating whether a keyboard is actually present and responsive to reads and writes to P_KBD. The SET_ACTIVE_KEYBOARD routine 223 then proceeds to step 230, where it examines the parameter returned by the KEYBOARD_CHECK routine 250 to determine if a keyboard is attached.

If so, the SET_ACTIVE_KEYBOARD routine 223 proceeds to step 232, where it returns with a flag indicating that the keyboard is present. At this point, KBD, and hence P_KBD, is correctly coupled to the keyboard connector 34, because the keyboard is responsive to accesses to P_KBD.

If at step 230 no keyboard was detected, the SET_ACTIVE_KEYBOARD routine 223 proceeds to step 234, where it routes KBD to the mouse/keyboard connector 36. This is accomplished by an I/O write to the I/O controller ASIC 32 setting EXT_MSE_SEL low and SHRE_KBD_SEL high. The SET_ACTIVE_KEYBOARD routine 223 then proceeds to step 236, where it again executes the KEYBOARD_CHECK routine 250, checking for keyboard presence by communications through P_KBD, as discussed in FIG. 8.

After this check, the SET_ACTIVE_KEYBOARD routine 223 proceeds to step 238, where it examines the parameter returned at step 236. If a keyboard was detected, then the I/O controller ASIC 32 has properly coupled KBD to the mouse/keyboard connector 36, as a keyboard is responsive to communications through P_KBD, so the SET_ACTIVE_KEYBOARD routine 223 proceeds to step 232 and returns a parameter indicating a keyboard is present.

If in step 238 a keyboard was not detected, the SET_ACTIVE_KEYBOARD routine 223 proceeds to step 240, where it enables keyboard emulation in the 8751 controller 42 by sending an expanded 8042-style command as discussed above. The SET_ACTIVE_KEYBOARD routine 223 then proceeds to step 242, where it again executes the KEYBOARD_CHECK routine 250. Part of the KEYBOARD_CHECK routine 250 includes sending a reset to P_KBD. Keyboard emulation in the 8751 controller 42 requires such a reset to begin active emulation. Thus, executing the KEYBOARD_CHECK routine 250 at step 242 causes the 8751 controller 42 to begin active keyboard emulation, subsequently responding to communications through P_KBD as if a keyboard were attached.

Figure 8:
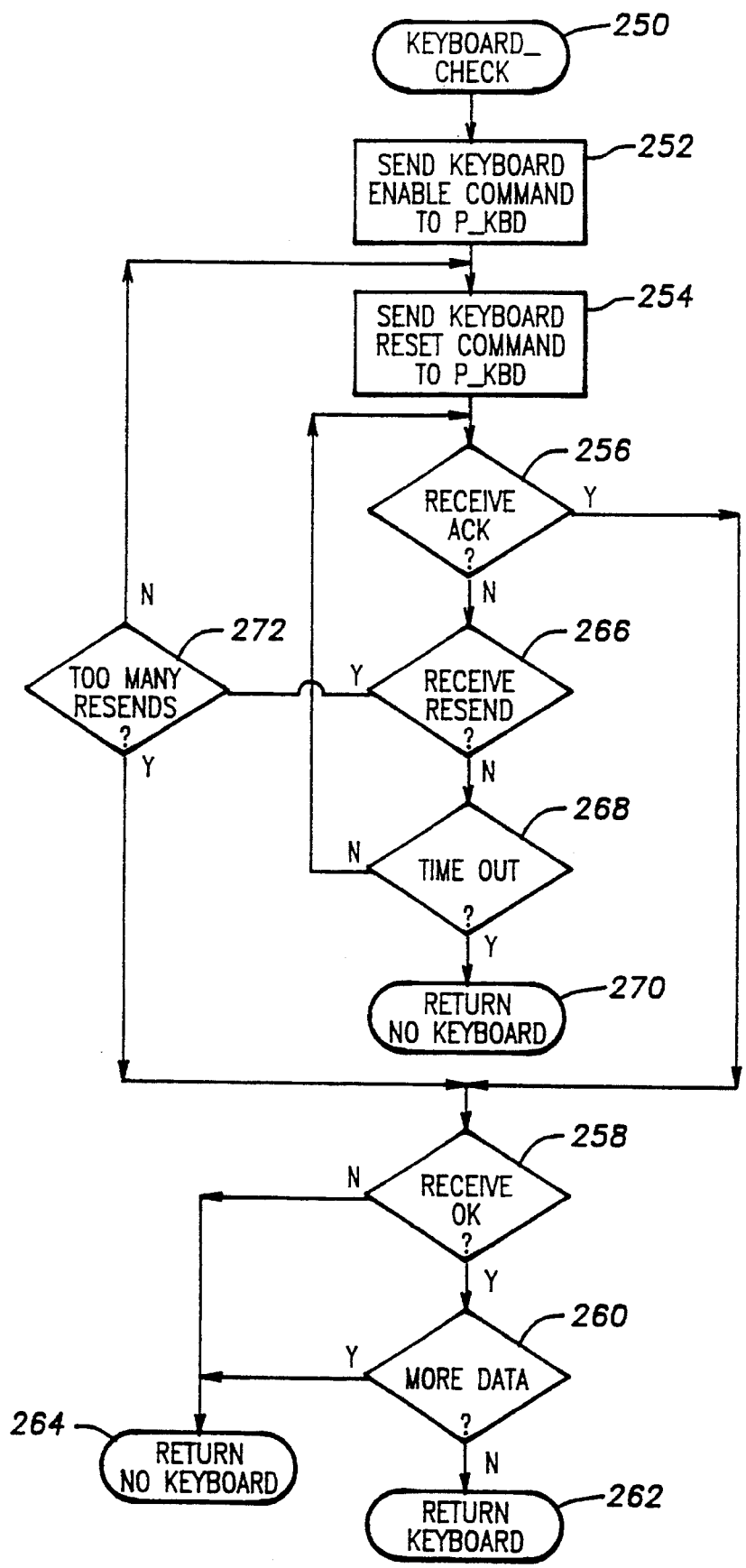

FIG. 8 shows a schematic of the KEYBOARD_CHECK routine 250. The KEYBOARD_CHECK routine 250 determines whether a keyboard is present at the connector to which KBD is currently routed.

Beginning at step 252, the KEYBOARD_CHECK routine 250 sends a standard keyboard enable command character to P_KBD to physically enable any attached keyboard, if present, to respond to commands. Then, at step 254, the routine KEYBOARD_CHECK 250 sends a keyboard reset command character to P_KBD. If a keyboard is present, it responds with a predetermined acknowledgement sequence as noted in the discussion below.

The KEYBOARD_CHECK routine 250 then proceeds to step 256, where it determines if it has received an acknowledgement character from P_KBD. If so, it proceeds to step 258, where it determines whether it has received a keyboard power on complete response character ("OK") from P_KBD. If so, the KEYBOARD_CHECK routine 250 proceeds to step 260, where it determines if more data is available from the P_KBD. More data indicates that some device other than a keyboard, such as a mouse, is sending a response. If no more data is available, the KEYBOARD_CHECK routine 250 proceeds to step 262, where it returns a parameter indicating that a keyboard is present on the currently routed to connector.

If at step 258 no keyboard present acknowledgement sequence was received, or at step 260 more data was received, the KEYBOARD_CHECK routine 250 proceeds to step 264, where it returns a parameter indicating no keyboard is connected to the currently routed to connector.

If at step 256 the KEYBOARD_CHECK routine 250 has not received an acknowledgement response from P_KBD, it proceeds to step 266 and determines whether it has received a resend response character from P_KBD. If not, the KEYBOARD_CHECK routine 250 proceeds to step 268, where it determines if too much time has passed since sending a reset to P_KBD.

If so, the KEYBOARD_CHECK routine 250 proceeds to step 270, where it returns a parameter indicating no keyboard is present. If not, the KEYBOARD_CHECK routine 250 loops to step 256 to again check for an acknowledgement response character.

If at step 266 the KEYBOARD_CHECK routine 250 received a resend response from P_KBD, it proceeds to step 272, where it determines if too many resends have been requested by P_KBD. If not, the KEYBOARD_CHECK routine 250 proceeds to step 254 to send another keyboard reset command character to P_KBD. Otherwise it proceeds to step 258, discussed above.

Figure 9:
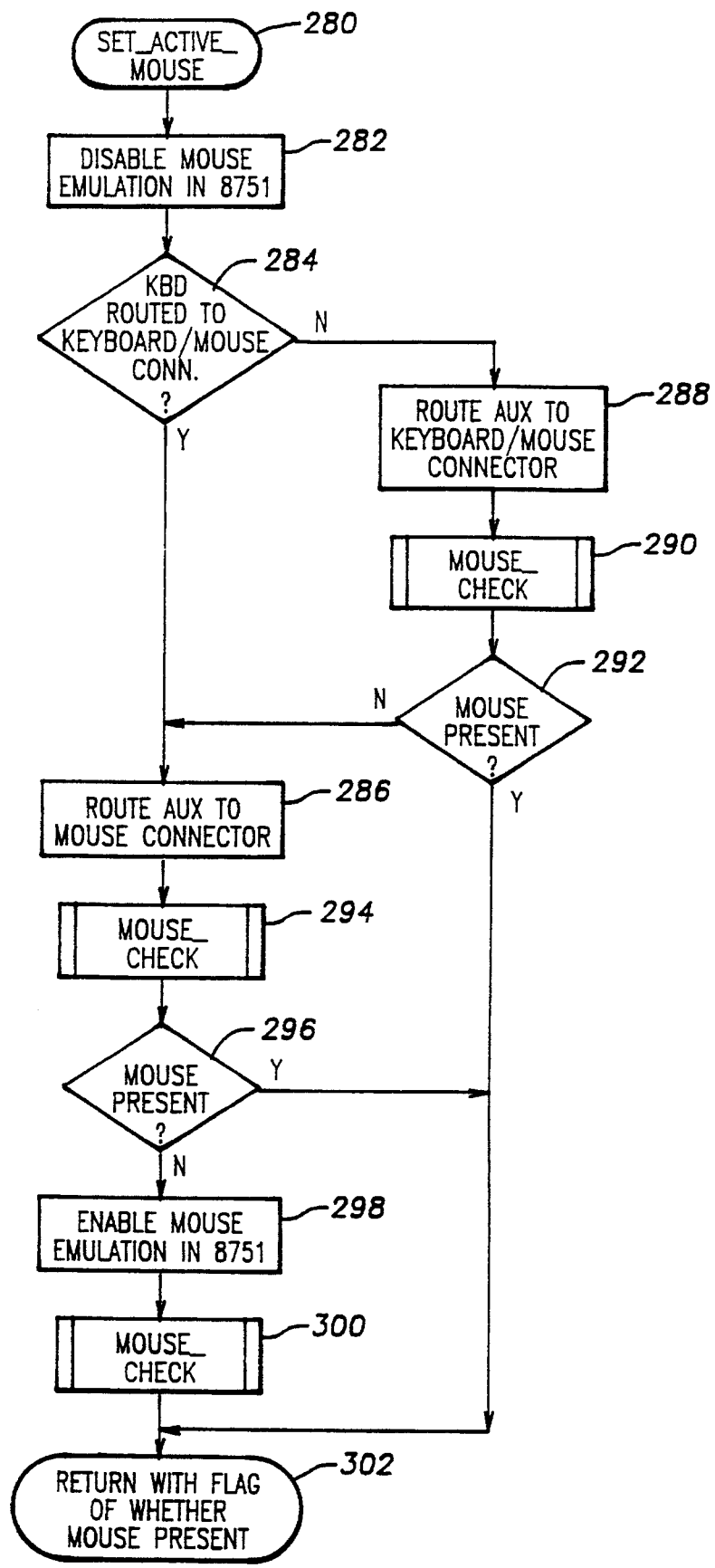

FIG. 9 is a flowchart of a SET_ACTIVE_MOUSE routine 280, which performs a function similar to the SET_ACTIVE_KEYBOARD routine 223, but to instead route AUX to the appropriate connector.

The SET_ACTIVE_MOUSE routine 280 begins at step 282 by disabling mouse emulation in the 8751. This step corresponds to step 224 in FIG. 7.

Proceeding to step 284, the SET_ACTIVE_MOUSE routine 280 determines whether KBD is connected to the mouse/keyboard connector 36. If so, the SET_ACTIVE_MOUSE routine 280 proceeds to step 286, skipping any determination of whether AUX is connected to the mouse/keyboard connector 36, because it is known that a keyboard is connected to that connector.

If at step 284 KBD was not connected to the mouse/keyboard connector 36, the SET_ACTIVE_MOUSE routine 280 proceeds to step 288, where it routes AUX to the mouse/keyboard connector 36. Proceeding to step 290, the SET_ACTIVE_MOUSE routine 280 performs a MOUSE_CHECK routine 310, which determines whether a mouse is present for communication through P_AUX. Continuing to step 292, the SET_ACTIVE_MOUSE routine 280 checks the parameter returned by the MOUSE_CHECK routine 310 executed at step 290. If a mouse was not detected, the SET_ACTIVE_MOUSE routine 280 proceeds to step 286, where it connects AUX to the mouse connector 25.

The SET_ACTIVE_MOUSE routine 280 then proceeds to step 294, where it again executes the MOUSE_CHECK routine 310. Proceeding to step 296, the parameter returned by the MOUSE_CHECK routine 310 at step 294 is checked, and if a mouse is not present, the SET_ACTIVE_MOUSE routine 280 proceeds to step 298, where it enables mouse emulation in the 8751 controller 42, and then to step 300, where it again performs the MOUSE_CHECK routine 310. Steps 298 and 300 correspond to steps 240 and 242 of FIG. 7.

If at step 292 a mouse was not detected or at step 296 a mouse was detected, and always from step 300, the SET_ACTIVE_MOUSE routine 280 proceeds to step 302, where it returns with a parameter indicating whether a mouse is present at the currently routed AUX connector.

Figure 10:
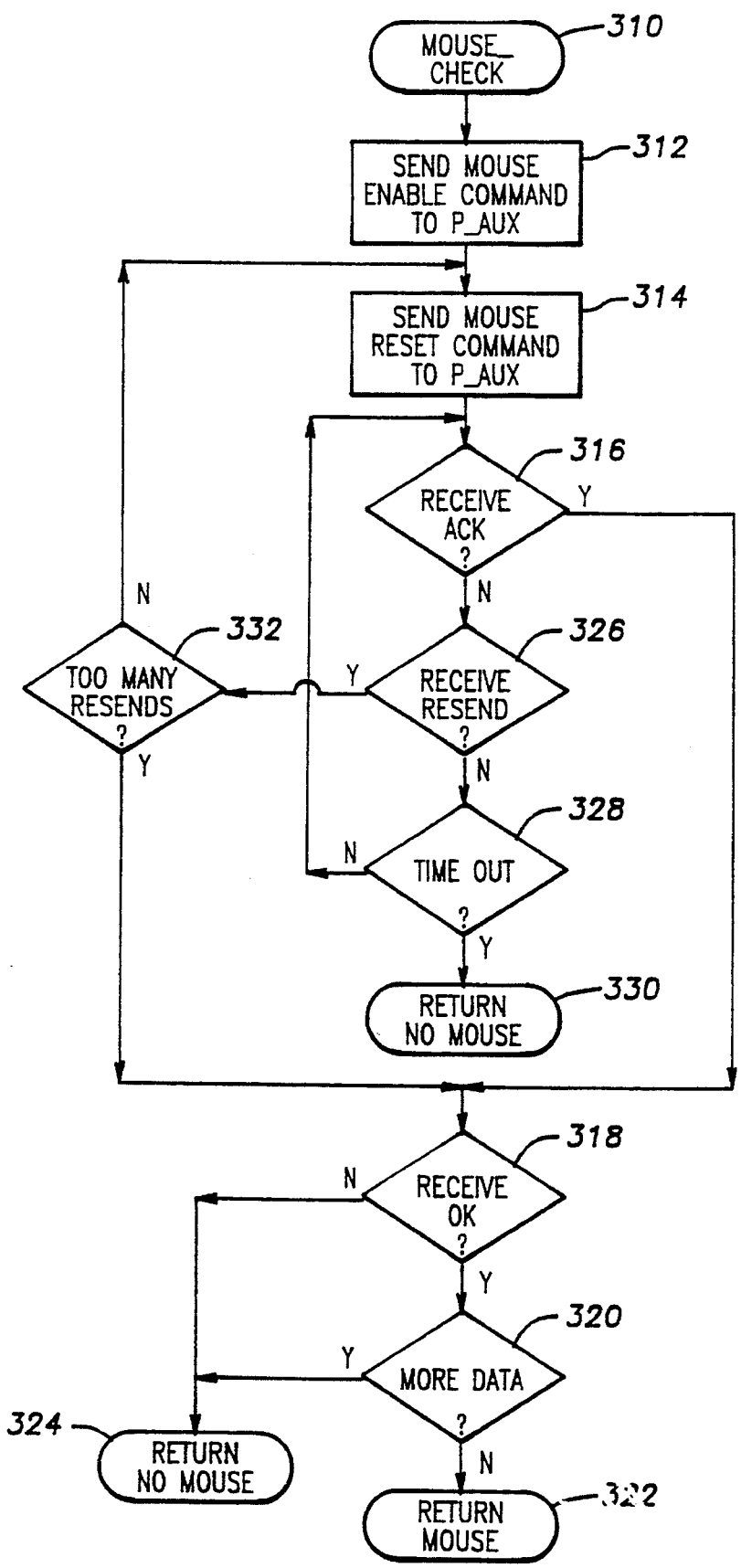

FIG. 10 is a flowchart of the MOUSE_CHECK routine 310. All of the steps of the MOUSE_CHECK routine 310 correspond to the steps of the KEYBOARD_CHECK routine 250, with the exception that P_AUX is used for communications with the mouse rather than P_KBD for communications with the keyboard, and at step 320, corresponding to step 260 of the KEYBOARD_CHECK routine 250 of FIG. 8, if more data is detected, the MOUSE_CHECK routine 310 proceeds to step 322 and returns a parameter indicating mouse presence. Otherwise, the MOUSE_CHECK routine 310 proceeds from step 320 to 324, returning a parameter indicating that no mouse is present. This reflects the fact that a mouse returns more data in response to a reset command character then does a keyboard. In this way, a keyboard is differentiated from a mouse, and mouse presence is determined by the MOUSE_CHECK routine 310. Otherwise, steps 312–332 are identical to those in the KEYBOARD_CHECK routine 250 of FIG. 8.

Figure 11:
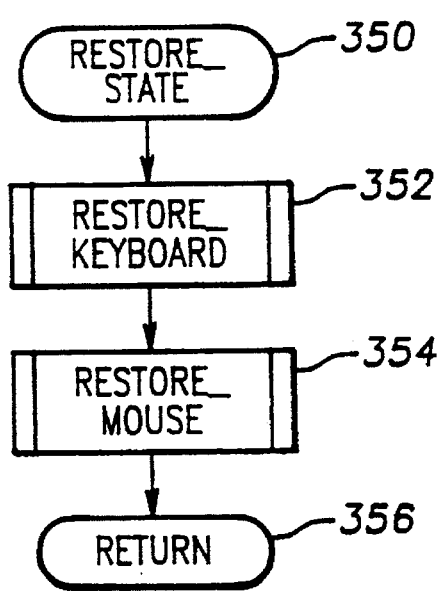

FIG. 11 is a flowchart of the RESTORE_STATE routine 350 called at step 220 of the WAKE_UP routine 214 shown in FIG. 6. The RESTORE_STATE routine 350 restores the state, or configuration, of any keyboard and a mouse attached to the system, and whether or not such devices are attached, provides configuration commands for capture by the keyboard and mouse emulation routines of the 8751 controller 42 so that those emulation routines can save the configuration data for the next shutdown.

Beginning at step 352, the RESTORE_STATE routine 350 calls a RESTORE KEYBOARD routine 360. This is discussed below in conjunction with FIG. 12, but to summarize, it restores the configuration data to the keyboard, if attached, and to the keyboard emulation routine.

Proceeding to step 354, the RESTORE_STATE routine 350 similarly restores the configuration of any mouse attached to the system C, and provides configuration data for capture by the mouse emulator in the 8751 controller 42. The RESTORE_STATE routine 350 then returns at step 356 to the WAKE_UP routine 214 of FIG. 6.

Figure 12:
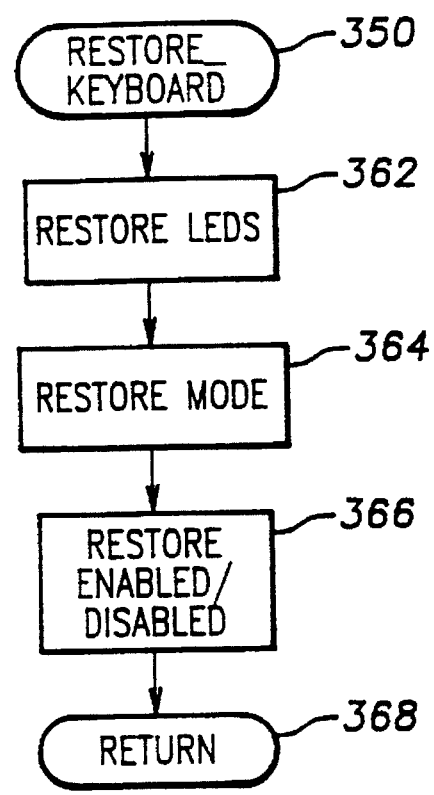

FIG. 12 is a flowchart of the RESTORE_KEYBOARD routine 360, which begins at step 362 by restoring the LED configuration of an attached keyboard or at least providing that configuration information to the emulation routine in the 8751 controller 42. The RESTORE_KEYBOARD routine 360 does this by retrieving the data saved by the SAVE_STATE routine 202 shown in FIG. 5. It then sends appropriate keyboard command characters through P_KBD, causing the keyboard LEDs to be set to their previous, pre-shutdown state.

Proceeding to step 364, the RESTORE_KEYBOARD routine 360 restores the mode configuration of the keyboard, and at step 366 restores whether the keyboard was enabled or disabled, accomplishing both functions by writing keyboard command characters. The RESTORE_KEYBOARD routine 360 then returns to the RESTORE_STATE routine 350 at step 368.

Figure 13:
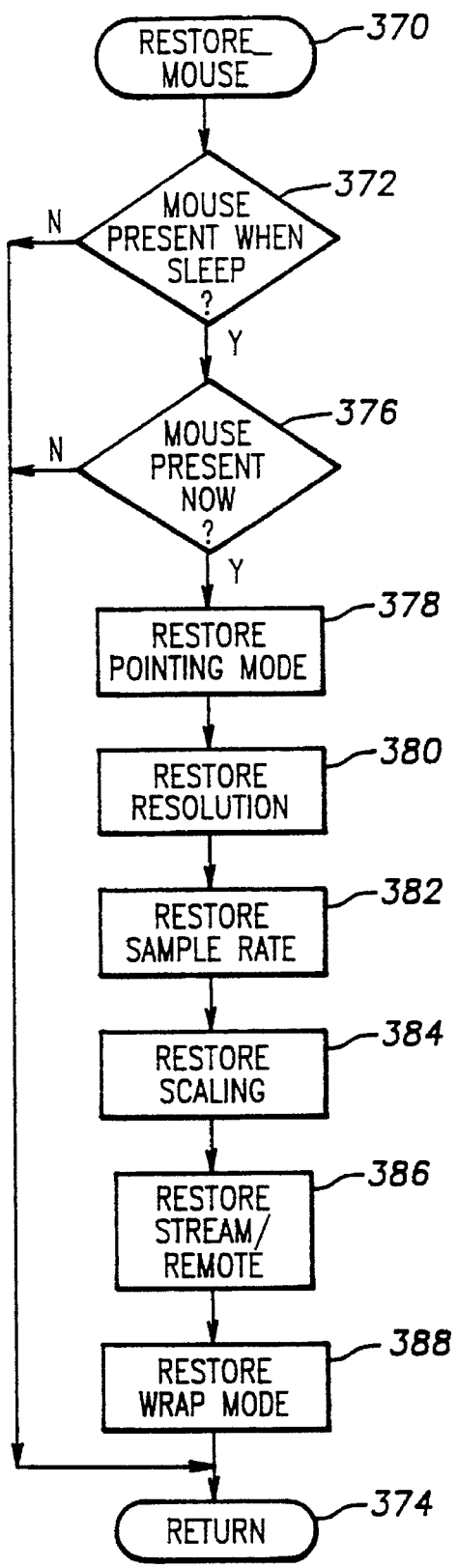

FIG. 13 is a flowchart of the RESTORE_MOUSE routine 370. This routine performs a function similar to that of the RESTORE_KEYBOARD routine 360. It begins at step 372 by determining if a mouse was present when the SLEEP routine 200 was last executed. This presence was saved at step 210 (FIG. 5), and as discussed above, is always true when mouse emulation capability is enabled. If not, no mouse is present to be reconfigured, so the RESTORE_MOUSE routine 370 proceeds to step 374, where it returns to the RESTORE_STATE routine 350. If a mouse was present when the SLEEP routine 200 was last executed, the RESTORE_MOUSE routine 370 proceeds from step 372 to 376, where it determines if a mouse is now present. Again, if not, the RESTORE_MOUSE routine 370 returns at step 374.

Otherwise, the RESTORE_MOUSE routine 370 proceeds from step 376 to step 378, where it restores the mouse pointing mode, to step 380, where it restores the mouse resolution, to step 382, where it restores the mouse sampling rate, to step 384, where it restores the scaling factor, to step 386, where it restores stream/remote mode, and to step 388, where it restores the wrap mode. As in the RESTORE_KEYBOARD routine 360, the RESTORE_MOUSE routine 370 performs these functions by writing mouse command characters to P_AUX, which has already been set to the appropriate connector by the SET_ACTIVE_MOUSE routine 280.

Figure 14:
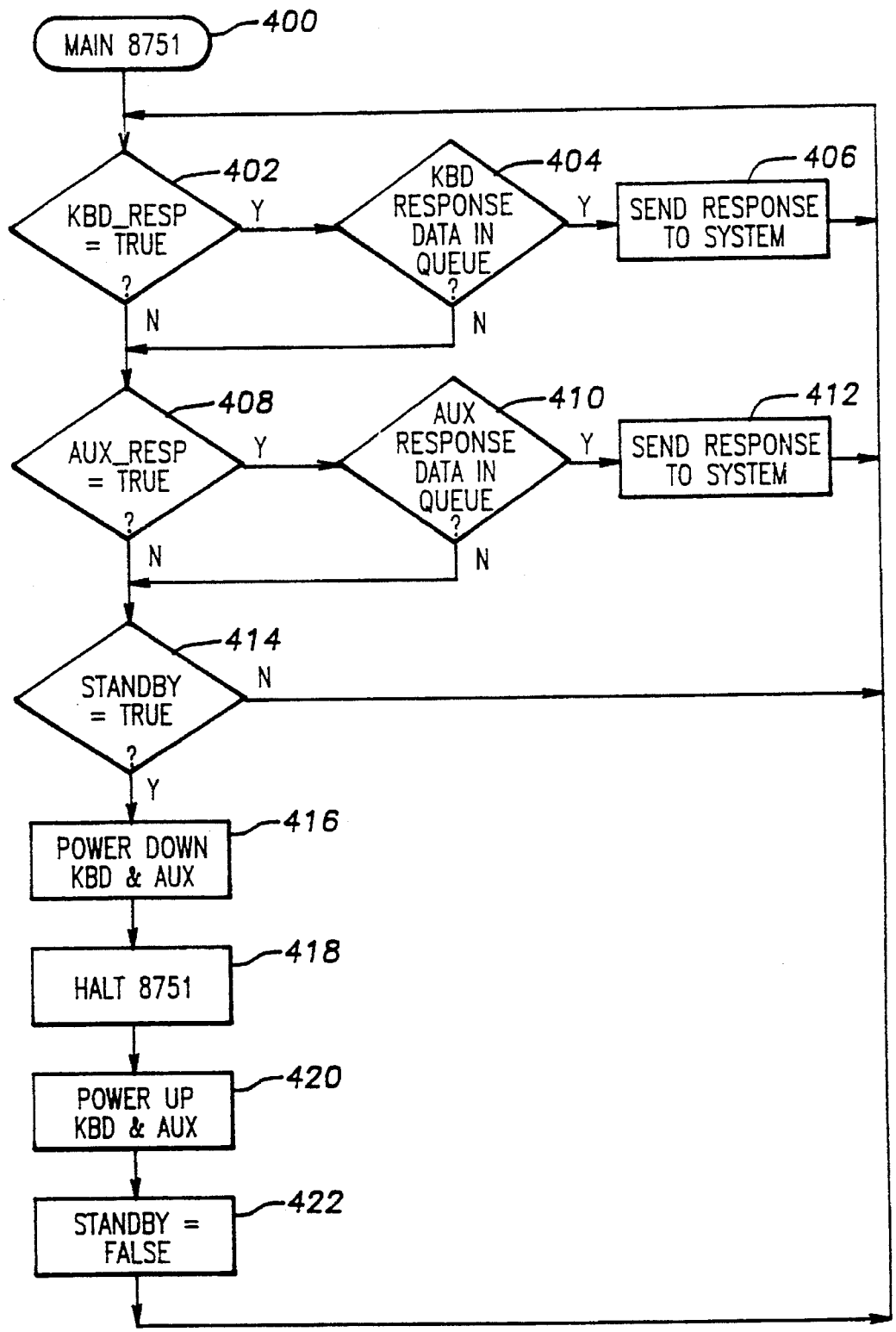
FIGS. 14, 15, 16, 17A, 17B, 17C, 17D, 18A, 18B, 18C and 18D are flowcharts of software implemented in the keyboard and auxiliary device controller according to the invention.

FIGS. 14–18D are flowcharts of routines implemented in the 8751 controller 42 that provide keyboard and mouse emulation such that the system C believes that a keyboard is responding to I/O through P_KBD and a mouse is responding to I/O through P_AUX. FIG. 14 is a flowchart of a MAIN_8751 routine 400, the main processing loop in the 8751 controller 42. The MAIN_8751 routine 400 continually loops, receiving flags from interrupt routines indicating system and device I/O activity. Particularly, an interrupt is provided from the I/O control ASIC 32 when a command and data have been received from the processor 10 or a device. The command and data are then processed in a command interpretation sequence discussed below.

As will be obvious to one skilled in the art, the MAIN_8751 routine 400 shown in FIG. 14 has omitted a number of other functions that the 8751 controller 42 would perform. The flowchart is specifically directed to showing the high level P_KBD and P_AUX interfaces, the interface with the low level interrupt routines, and the powering down of any attached keyboard and mouse devices.

In the discussion that follows, it is important to note the relationship of keyboard and mouse emulation to the physical devices themselves. Further, emulation includes the two distinct function of capturing command characters and providing responses to those characters to the processor 10. Mouse and keyboard emulation are always active in the sense that the routines discussed below trap any mouse or keyboard configuration command characters from the processor 10 in order to save the resulting configuration state. If a mouse or keyboard is physically present, these command characters are further passed to the device itself.

Mouse and keyboard response emulation, however, is only active if a mouse or keyboard was not plugged in after the system C last came out of standby. If emulation of responses is active and a mouse or keyboard is then installed, data from the mouse and keyboard still pass through to the processor 10. Commands to the mouse and keyboard, however, are trapped and responded to by the emulation routines, and not passed to the mouse and the keyboard.

Beginning at step 402, the MAIN_8751 routine 400 compares a variable KBD_RESP to true. KBD_RESP indicates whether the 8751 controller 42 should emulate keyboard responses, and is set and reset by a device interrupt routine DEVICE_INT_8751 450, described below in conjunction with FIG. 15, and a system interrupt routine SYS_INT_8751 500, described below in conjunction with FIG. 16. Data from an actually connected keyboard is passed to the processor 10, whether or not KBD_RESP is true, by the DEVICE_INT_8751 routine 450 discussed below.

If KBD_RESP is true, the MAIN_8751 routine 400 proceeds to step 404, where it examines a keyboard response data queue to determine whether any data is available to send to the processor 10 from a keyboard emulation routine KBD_EMULATE 550, discussed below in conjunction with FIG. 17A–17D. This queue is a first-in first-out queue that allows the KBD_EMULATE routine 550 to provide multiple responses to certain keyboard command characters.

If data is available in the keyboard response data queue, the MAIN_8751 routine 400 proceeds from step 404 to step 406, where it then sends a character in the keyboard response data queue to the processor 10, and then proceeds to the top of the loop at step 402.

If at step 404 no data was present in the keyboard response data queue or at step 402 KBD_RESP was false, the MAIN_8751 routine 400 proceeds to step 408, where it compares a variable AUX_RESP to true. AUX_RESP performs a function corresponding to KBD_RESP, but for AUX, and as in steps 402, 404 and 406, if AUX_RESP is true, the routine proceeds to step 410 to check an auxiliary response data queue, and if data is available, at step 412 sends a character from the auxiliary response data queue to the processor 10 through P_AUX, and then proceeds to the top of the loop at step 402.

If at step 410 no auxiliary response was available in the queue or at step 408 AUX_RESP was false, the MAIN_8751 routine 400 proceeds to step 414, where it determines if a flag STANDBY is true.

STANDBY is set by an expanded command, described above, from the processor 10, which instructs the 8751 controller 42 to shut off power to I/O devices and then to power down. The processor 10 sends an expanded command to the 8751 controller 42 to go into standby at step 204 shown in FIG. 4. If at step 204 (FIG. 4) the system C was instead placed in hibernation mode, the 8751 controller 42 is instead powered down, and re-enters the MAIN-8751 routine 400 at step 402, but only after performing startup routines not shown that restore its state. If at step 414 STANDBY is false, the MAIN_8751 routine 400 proceeds to the top of the loop at step 402.

If STANDBY is true, however, the MAIN_8751 routine 400 proceeds from step 414 to step 416, where it powers down the keyboard connector 34, the mouse connector 35, and the mouse/keyboard connector 36. The 8751 controller 42 does this by asserting KPWR_EN* and MKPWR_EN* by a write to a memory mapped I/O register in the I/O controller ASIC 32, cutting off power to those connectors. The MAIN_8751 routine 400 then proceeds to step 418, where it causes the 8751 controller 42 to go into a suspended state by a write to a specific I/O bit in a special register in the 8751 controller 42 itself. The 8751 controller 42 remains in this reduced power halt state until receiving an interrupt from one of its various interrupt sources, at which time the MAIN_8751 routine 400 proceeds to step 420, where it returns power to the keyboard connector 34, the mouse connector 35, and the mouse/keyboard connector 36, this time by negating KPWR_EN* and MKPWR_EN* through a memory mapped I/O write to the I/O controller ASIC 32. The MAIN_8751 routine 400 then resets the STANDBY flag at step 422, and loops to the top, step 402.

Figure 15:
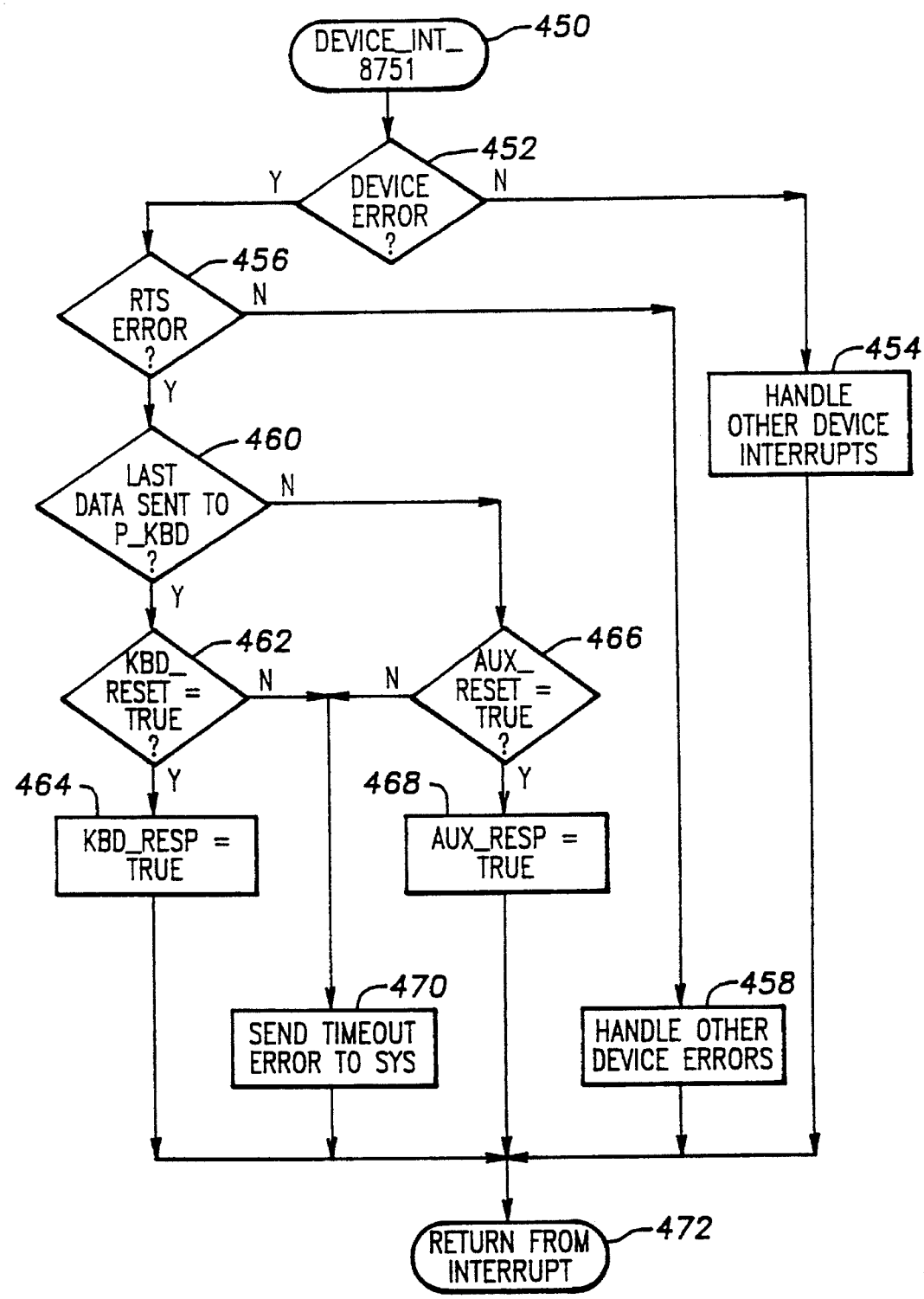

FIG. 15 is a flowchart of the DEVICE_INT_8751 routine 450, which is a portion of an interrupt routine in the 8751 controller 42 that specifically handles interrupts from KBD and AUX. These interrupts are passed to the 8751 controller 42 from the I/O controller ASIC 32 over INT0.

Beginning at step 452, the DEVICE_INT_8751 routine 450 checks for an error from KBD or AUX, which would indicate the I/O controller ASIC 32 has encountered an error in attempting to communicate with the mouse connector 35, the keyboard connector 34, or the mouse/keyboard connector 36. The DEVICE_INT_8751 routine 450 determines the existence and type of such errors through memory mapped I/O registers in the I/O controller ASIC 32. If there is no error, this indicates a normal response from a device attached to one of those connectors, so the DEVICE_INT_8751 routine 450 proceeds to step 454, where it handles other device interrupts, such as by transmitting a data byte or command character response from KBD or AUX to the processor 10 over P_KBD or P_AUX.

If at step 452 the DEVICE_INT_8751 routine 450 detected a device error is the cause of this interrupt, it proceeds to step 456, where it determines whether the error was a request to send (RTS) error. A RTS error occurs when the I/O controller ASIC 32 attempts to send data from either AUX or KBD to the routed connector and a timeout occurs before any attached device responds. This would occur, for example, if a mouse or keyboard were not attached to the keyboard connector 34, the mouse connector 35, or the mouse/keyboard connector 36 routed to AUX or KBD.

If not an RTS error, the DEVICE_INT_8751 routine 450 proceeds to step 458, where it handles other device errors normally. If an RTS device error, however, the DEVICE_INT_8751 routine 450 proceeds from step 456 to 460, where it determines if the last device data sent was to KBD.

If so, the DEVICE_INT_8751 routine 450 proceeds to step 462, where it determines whether two variables KBD_RESET and KBD_EMULATE are true. KBD_RESET is set to true when a keyboard reset command character is sent to P_KBD by the processor 10, and this provides a useful time at which to begin keyboard emulation. KBD_RESET is discussed further below in conjunction with FIGS. 17A–17D. KBD_EMULATE is set true by a special expanded command from the processor 10, and indicates that the processor 10 has enabled the keyboard emulation feature of the 8751 controller 42. It is further discussed below in conjunction with FIG. 16.

If KBD_RESET and KBD_EMULATE are true at step 462, the DEVICE_INT_8751 routine 450 proceeds to step 464, where it sets KBD_RESP to true. This provides a flag to the MAIN_8751 routine 400 at step 402 to begin keyboard emulation responses.

If at step 460 the last data sent was not to KBD, the last data was sent to AUX, so the DEVICE_INT_8751 routine 450 proceeds to step 466, where it determines if two variables AUX_RESET and AUX_EMULATE are true. AUX_RESET performs the same function as KBD_RESET on writes to a mouse device as does KBD_RESET for a keyboard device as described at step 462, and AUX_EMULATE corresponds to KBD_EMULATE. If AUX_RESET and AUX_EMULATE are true, the DEVICE_INT_8751 routine 450 proceeds to step 468, where it sets AUX_RESP equal to true, for the same reason that KBD_RESP was set to true at step 464. AUX_RESP is used at step 408 of the MAIN_8751 routine 400.

If at steps 462 or 466 KBD_RESET or AUX_RESET were not true, the DEVICE_INT_8751 routine 450 proceeds to step 470, where it sends a timeout error to the system, which is a normal response for an RTS error if emulation is not enabled. This represents a standard device error when a device does not respond to a write.

KBD_RESP and AUX_RESP are only set to true when the last command sent to a keyboard or mouse was a reset because otherwise intermittent device errors could cause the 8751 controller 42 to enter emulation mode whenever they occurred.

From steps 454, 458, 464, 468 and 470, the DEVICE_INT_8751 routine 450 proceeds to step 472, where it returns from the interrupt.

Figure 16:
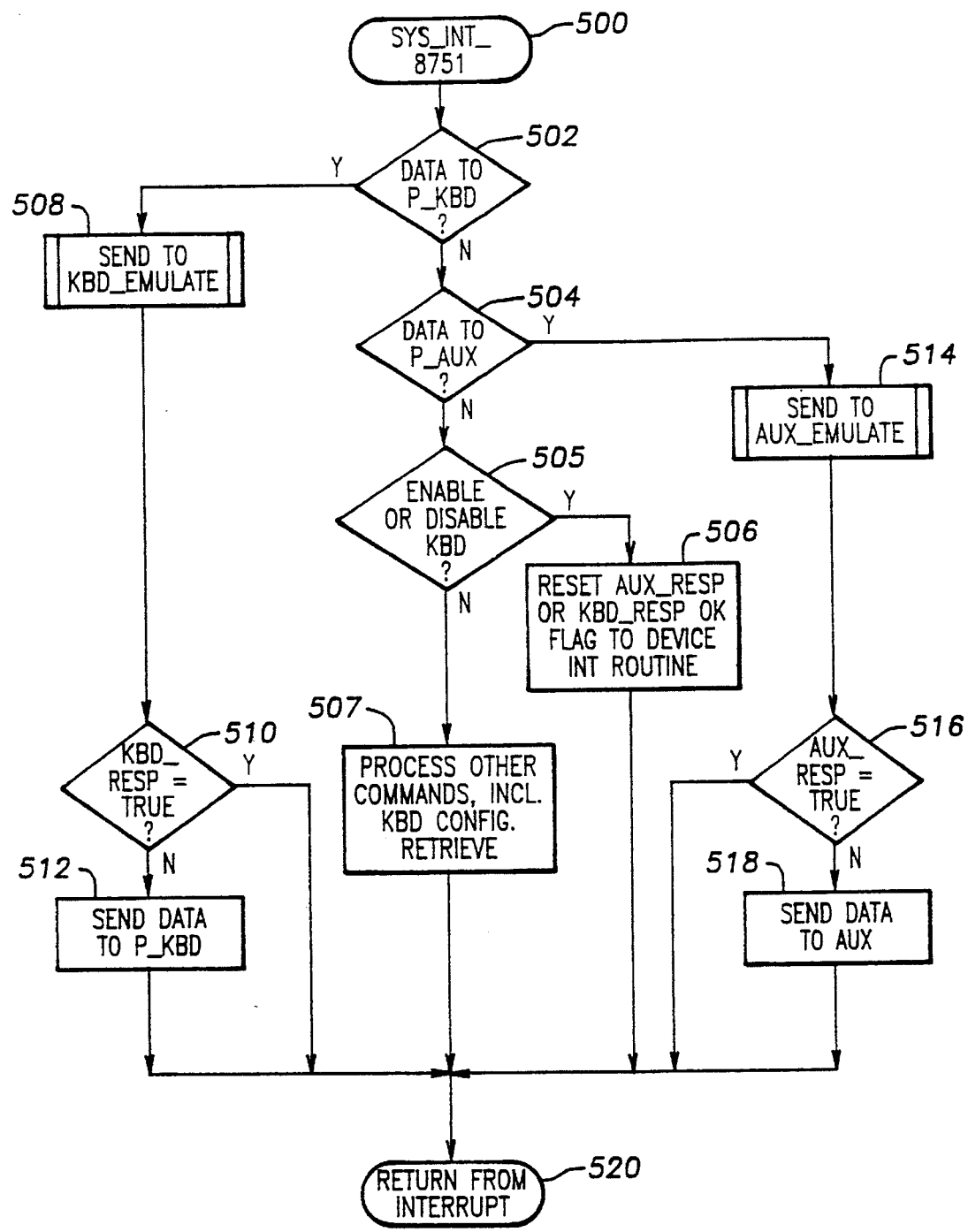

FIG. 16 is a flowchart of a SYS_INT_8751 routine 500 for handling interrupts from the processor 10. This interrupt routine is activated by 8042-style writes through the I/O controller ASIC 32 from the processor 10, and can include data and command characters and other 8042-type commands typically handled by IBM PC compatible systems. The I/O controller ASIC 32 informs the 8751 controller 32 of such writes through INT0, and the 8751 controller 42 then determines that the processor 10 was the source of that interrupt by reading a memory mapped I/O register in the I/O controller ASIC 32. This determination is made by an interrupt processing routine not shown.

The SYS_INT_8751 routine 500 begins at step 502 by determining if the interrupt was caused by a write to P_KBD, or a request to send data to KBD. If not such a request, the SYS_INT_8751 routine 500 proceeds to step 504, where it determines if the interrupt was caused by a write to P_AUX, or a request to send data to AUX. If not, the SYS_INT_8751 routine 500 proceeds to step 505, where it determines whether the command was an enable or disable keyboard or auxiliary device emulation command.

If such a command, the SYS_INT_8751 routine 500 proceeds to step 506, where it appropriately enables or disables the keyboard or auxiliary device emulation. To disable, it simply sets KBD_RESP and KBD_EMULATE or AUX_RESP and AUX_EMULATE false. To enable, it sets KBD_EMULATE or AUX_EMULATE true. The DEVICE_INT_8751 routine uses these flags to allow keyboard or auxiliary emulation to be enabled at steps 464 and 468.

If not an enable or disable at step 505, the SYS_INT_8751 routine 500 proceeds to step 507, where it processes other system commands, including expanded commands as discussed above. These expanded commands include powering down the 8751 controller 42 and also include returning keyboard configuration data.

If at step 502 the interrupt indicated data is to be sent to KBD, the SYS_INT_8751 routine 500 proceeds to step 508, where it executes the KBD_EMULATE routine 550. Keyboard data is sent to the KBD_EMULATE routine 550 whether emulation mode is active or not, because if the processor 10 instructs the 8751 controller 42 to power down, the KBD_EMULATE routine 550 must return the configuration data to the system, and it can only do this if it has previously captured this configuration data. The KBD_EMULATE routine 550 is discussed below in conjunction with FIGS. 17A–17D. From step 508, the SYS_INT_8751 routine 500 proceeds to step 510, where it determines whether KBD_RESP is true. If not, the SYS_INT_8751 routine 500 proceeds to step 512, where it sends the command or data character to KBD, thus allowing an attached keyboard to respond.

If at step 504 the interrupt indicated that data is to be sent to an auxiliary device, the SYS_INT_8751 routine 500 proceeds to step 514, 516, and 518 to perform functions corresponding to steps 508, 510, and 512 for AUX and its related variables.

From steps 506, 507, 510, 512, 516, and 518, the SYS_INT_8751 routine 500 then proceeds to step 520, where it returns from the interrupt.

Keyboard emulation is handled by the KBD_EMULATE routine 550, flowcharted in FIGS. 17A–17D. The KBD_EMULATE routine 550 receives data from the SYS_INT_8751 routine 500 shown in FIG. 16 at step 508, and performs two main functions. First, it captures configuration command characters and saves the resulting configuration state so that the processor 10 can retrieve that configuration and store it when the processor 10 instructs the 8751 controller 42 to enter a standby mode. Second, it emulates responses of a standard IBM PC compatible keyboard when keyboard emulation is enabled as indicated by KBD_RESP.

Beginning at step 552, the KBD_EMULATE routine 550 checks the data to be sent to KBD to determine if it is a resend command character. If so, the KBD_EMULATE routine 550 proceeds to step 554, where it puts the last byte sent from KBD into the keyboard response data queue. This response queue will then be read at step 404 of the MAIN_8751 routine 400 as shown in FIG. 14, where the data is then sent to the processor 10 at step 406. Then, at step 556, KBD_RESET is set to false, indicating that the last command character sent by the processor 10 to P_KBD was not a reset command.

If at step 552 the KBD_EMULATE routine 550 determined that a resend command has not been sent to P_KBD, the KBD_EMULATE routine 550 proceeds to step 558, where it determines if this data should be handled as a resume sequence. Certain command characters destined for an IBM PC compatible keyboard require more than one byte of information, and if such a command character was previously sent, this character must be handled by routines that handle those subsequent characters. This is further discussed below in conjunction with FIG. 17C.

If not in such a multi-byte command sequence, the KBD_EMULATE routine 550 proceeds from step 558 to step 560, where it determines whether the command character is an invalid command character or a normal data character. If invalid, it proceeds to step 562, where it puts a resend request character in the keyboard response data queue if the command character was bad, and simply does nothing if the data at 560 was not an invalid command character but instead just normal data being sent to P_KBD. Then, at step 564, the KBD_EMULATE routine 550 returns from both steps 556 and 562.

Figure 17A:
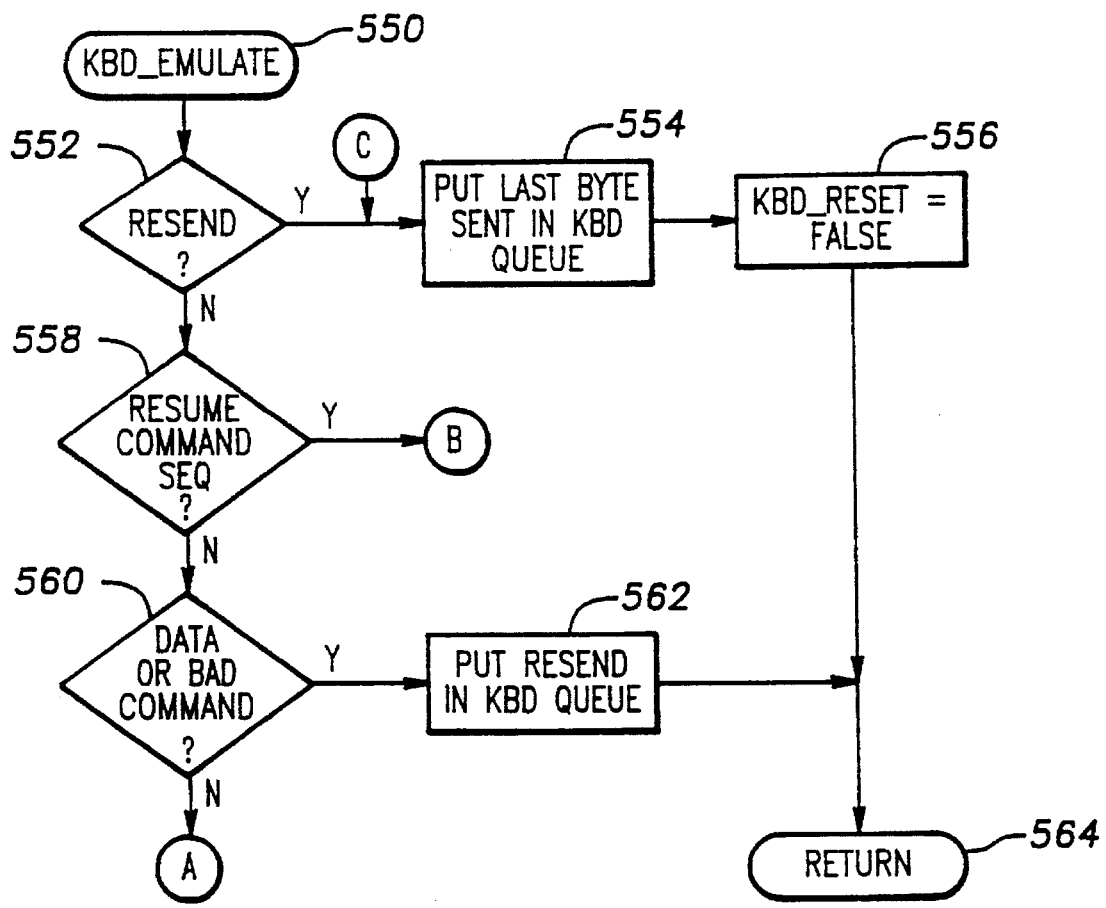
Figure 17B:
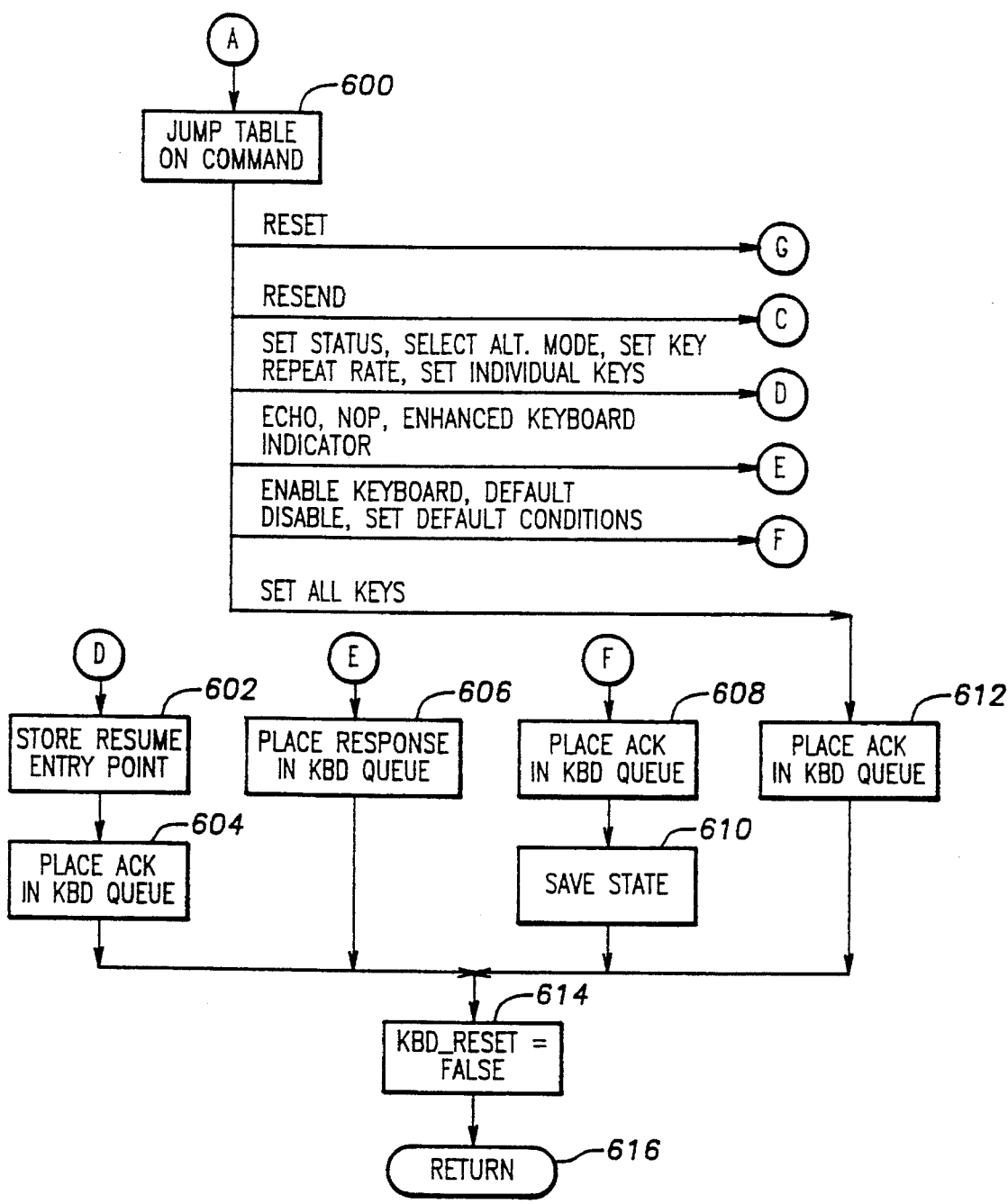

If at step 560 the KBD_EMULATE routine 550 determined that the data sent from the processor 10 through the I/O controller ASIC 32 was not a bad command character and was not data, it proceeds to step 600, shown in FIG. 17B. Step 600 indicates a jump table, which branches to various routines depending upon the command character the processor 10 sent to P_KBD. Certain commands require that the next data byte be handled by a resume command sequence as described in step 558, certain commands change the keyboard configuration, and certain commands require a response to be sent to the processor 10. This branching is based on these requirements, although each of these commands may require other standard functions to be performed, which are not shown.

If the command is a set status command, select alternative mode command, set keyboard repeat rate command, or set individual keys command, the KBD_EMULATE routine 550 proceeds to step 602, where it stores a resume routine entry point, as this is a two-byte command sequence, and then to step 604 where it places an acknowledgement response character in the keyboard response data queue. The KBD_EMULATE routine 550 could save some of the configuration data these commands may involve, but because they are so rarely used, that is considered unnecessary in this embodiment.

If the command is an echo command, no op command, or enhanced keyboard indicator command, the KBD_EMULATE routine 550 proceeds to step 606, where it places the appropriate response in the keyboard response data queue. These commands require no configuration data to be saved but do require a response be sent.

If the command is an enable keyboard command, default disable command, or set default conditions command, the KBD_EMULATE routine 550 proceeds to step 608, where it places an acknowledgement response character in the keyboard response data queue and then to step 610 where it saves the configuration state as set by the particular command. The state is saved in the 8751 controller 42 random access memory, and that state can then be provided by a special expanded 8042 command sequence at step 506 of the SYS_INT_8751 routine 500 shown in FIG. 16. This would entail passing the saved data to the processor 10 in response to this expanded command.

If the command is a set all keys command, the KBD_EMULATE routine 550 proceeds to step 612, where it places an acknowledgement response character in the keyboard response data queue. Again, the functionality of this command could be saved in the configuration state data as in step 610, but is considered not needed because of the rare utilization of this command.

From steps 604, 606, 610, and 612, the KBD_EMULATE routine 550 proceeds to step 614, where it sets KBD_RESET to false, indicating the last command to P_KBD was not a reset, and returns at step 616.

If at step 600 the command is a resend command, the KBD_EMULATE routine 550 proceeds from step 600 to 554, where it performs a resend function. If the command is a reset command at step 600, the KBD_EMULATE routine proceeds to step 500 and executes a reset function, discussed below in conjunction with FIG. 17D.

Figures 17C, 17D:
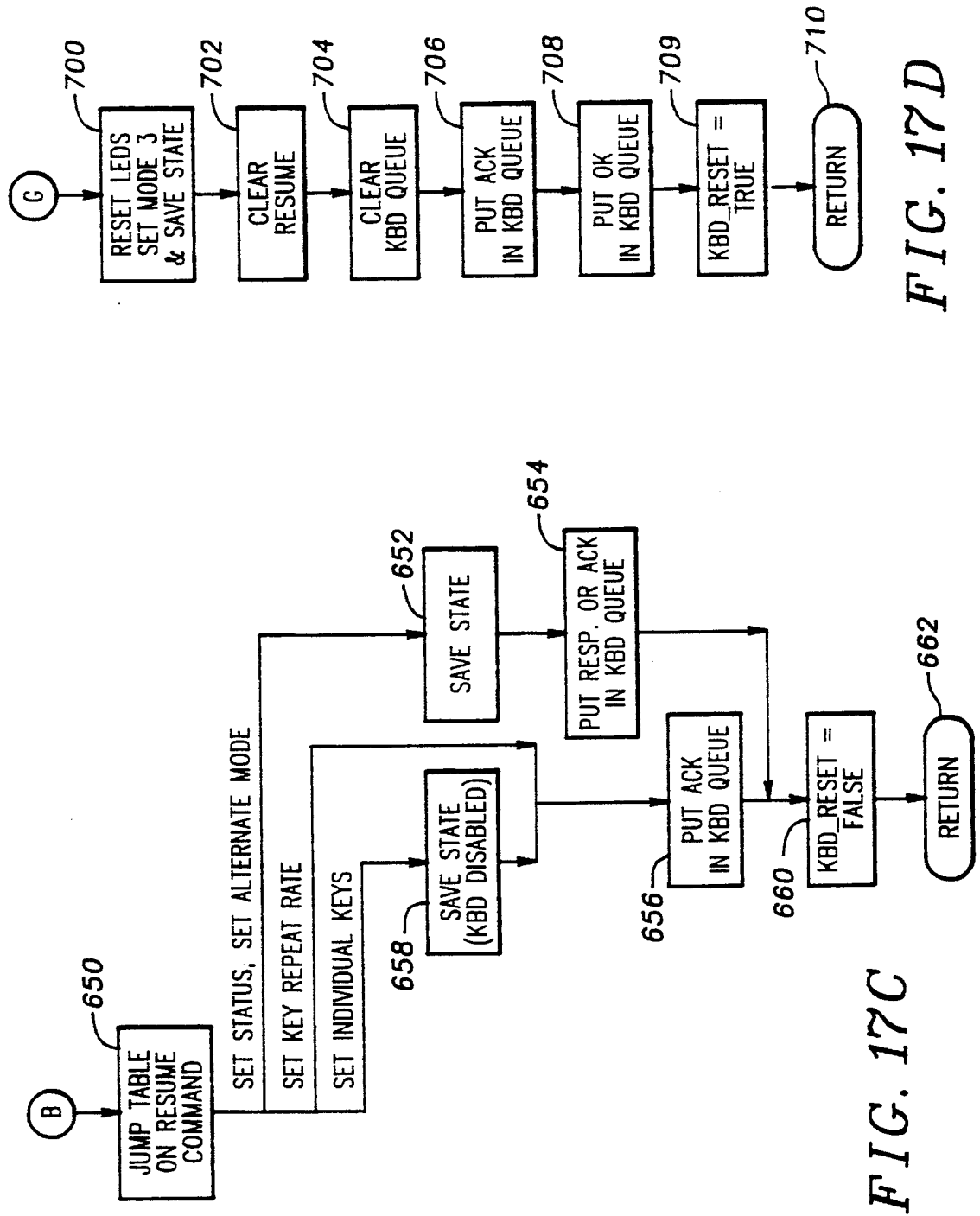

If at step 558 the KBD_EMULATE routine 550 determined it was in resume command sequence, it proceeds to step 650, shown in FIG. 17C. Step 650 indicates a jump table, which executes an appropriate jump based on the second character of the command sequence that the KBD_EMULATE routine 550 has determined that it is in.

If the command sequence is a set status or set alternate mode command sequence, the KBD_EMULATE routine 550 proceeds from step 650 to step 652 where it saves the state as set according to the command. Set status, for example, sets the status of the LEDs, and set alternate mode sets the keyboard mode. Then at step 654, an appropriate response or acknowledgement is placed in the keyboard response data queue.

If at step 650 a set key repeat rate command is determined, the state is not saved, although it could be. Instead the KBD_EMULATE routine 550 proceeds to step 656 where it places an acknowledgement character in the keyboard response data queue.

If at step 650 it is determined a set individual keys command sequence is being executed, the KBD_EMULATE routine 550 proceeds to step 658, where it saves a keyboard disabled state, which is appropriate for a set individual keys command, and then proceeds to step 656. From both steps 654 and 656, the KBD_EMULATE routine 550 proceeds to step 660, where it sets KBD_RESET to false, and then to step 662, where it returns.

If a reset command is determined at step 600, the KBD_EMULATE routine 550 proceeds to step 700 in FIG. 17D. In response to this command character, it resets the LEDs, sets mode three of operation, and saves the configuration state of the LEDs, the mode, and keyboard enable/disable state.

Then, at step 702 the KBD_EMULATE routine 550 clears any resume command sequence it may have previously been in, as a reset command cancels such a command sequence.

Continuing to step 704, the KBD_EMULATE routine 550 clears the keyboard response data queue, at step 706 puts an acknowledgement response in the keyboard response data queue, and at step 708 puts the keyboard OK response in the keyboard response data queue. The KBD_EMULATE routine 550 sets KBD_RESET true at step 709, as this was a reset command, and returns at step 710.

Emulation of a mouse or other pointer device is handled by the AUX_EMULATE routine 750, flowcharted in FIGS. 18A–18D. The AUX_EMULATE routine 750 receives data from the SYS_INT_8751 routine 500 shown in FIG. 16 at step 518, and performs the same two main functions as the KBD_EMULATE routine 550. First, it captures configuration command characters and saves the resulting configuration state so that the processor 10 can retrieve that configuration and store it when the processor 10 instructs the 8751 controller 42 to enter a standby mode. Second, it emulates responses of a standard IBM PS/2 compatible mouse when mouse emulation is enabled as indicated by AUX_RESP.

Beginning at step 752, the AUX_EMULATE routine 750 determines if the current configuration settings for AUX indicate that the mouse is in wrap mode. If so, the AUX_EMULATE routine 750 proceeds to step 754, where it determines if the processor 10 has sent a reset command character. If not, the AUX_EMULATE routine 750 proceeds to step 756, where it determines if the processor 10 has sent a reset wrap mode command character. If not, the wrap mode is enabled, so at step 758 the AUX_EMULATE routine 750 puts the data from the system C into the auxiliary response data queue, and returns at step 760. Otherwise, the AUX_EMULATE routine 750 proceeds to step 808 discussed below.

If at step 752 the AUX_EMULATE routine 750 determined that a connected or emulated mouse is not in wrap mode, the AUX_EMULATE routine 750 proceeds to step 762, where it checks the data to be sent to AUX to determine if it is a resend command character. If so, the AUX_EMULATE routine 750 proceeds to step 764, where it puts the last byte sent from AUX into the auxiliary response data queue. This response queue will then be read at step 410 of the MAIN_8751 routine 400 as shown in FIG. 14, where the data is then sent to the processor 10 at step 412. Then, at step 766, AUX_RESET is set to false, indicating that the last command character sent by the processor 10 to P_AUX was not a reset command.

If at step 762 the AUX_EMULATE routine 750 determined that a resend command had not been sent to P_AUX, the AUX_EMULATE routine 750 proceeds to step 768, where it determines if this data should be handled as a resume sequence. Certain command characters destined for an IBM PS/2 compatible mouse require more than one byte of information, and if such a command was character previously sent, this character must be handled by routines that handle those subsequent character. This is further discussed below in conjunction with FIG. 18C.

If not in such a multi-byte command sequence, the AUX_EMULATE routine 750 proceeds from step 768 to step 770, where it determines whether the command character is an invalid command character or a normal data character. If so, it proceeds to step 772, where it puts a resend request character in the auxiliary response data queue if the command was bad, and simply does nothing if the data at 770 was not an invalid command but instead just normal data being sent to P_AUX. Then, at step 774, the AUX_EMULATE routine 550 returns from both steps 766 and 772.

Figure 18A:
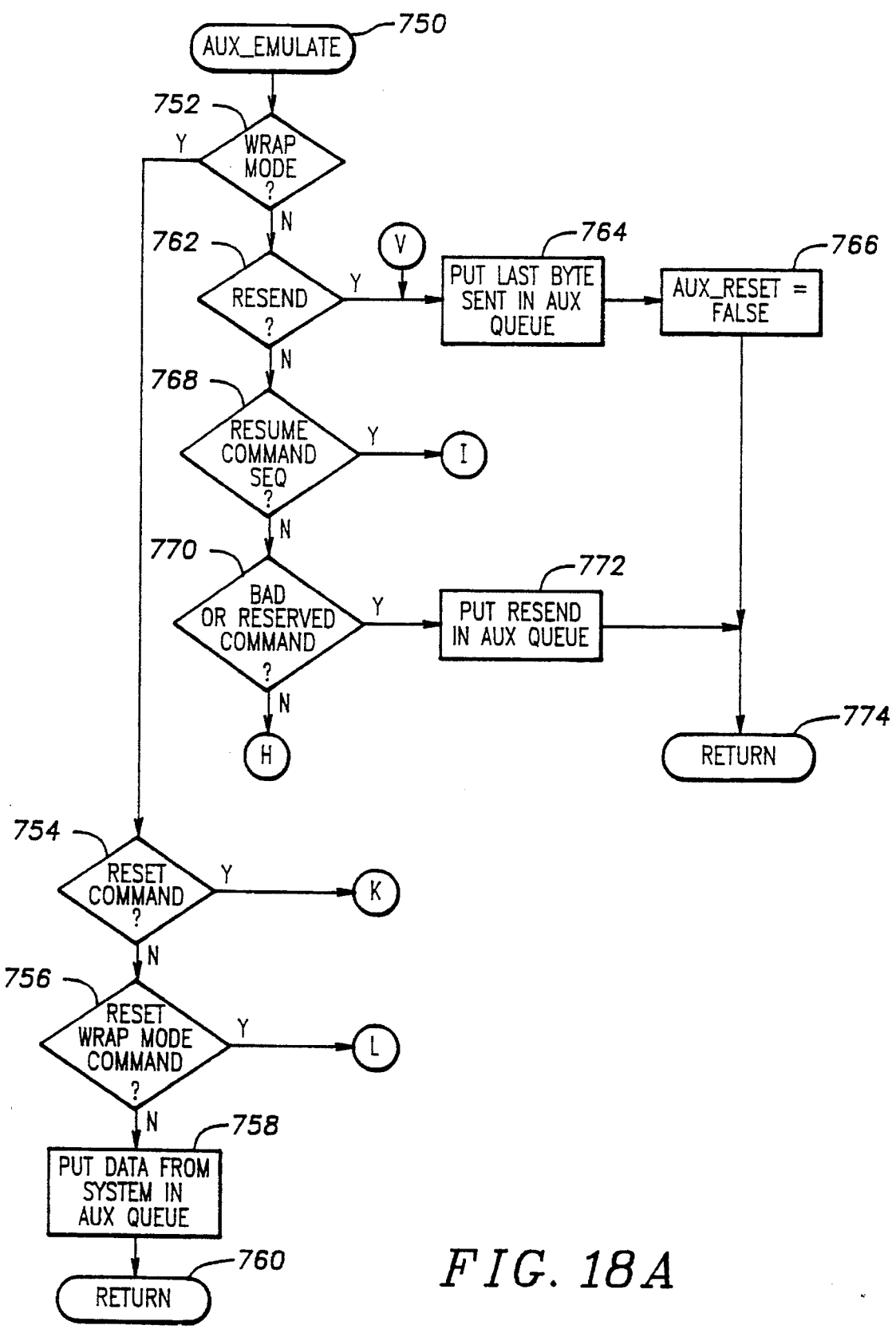
Figure 18B:
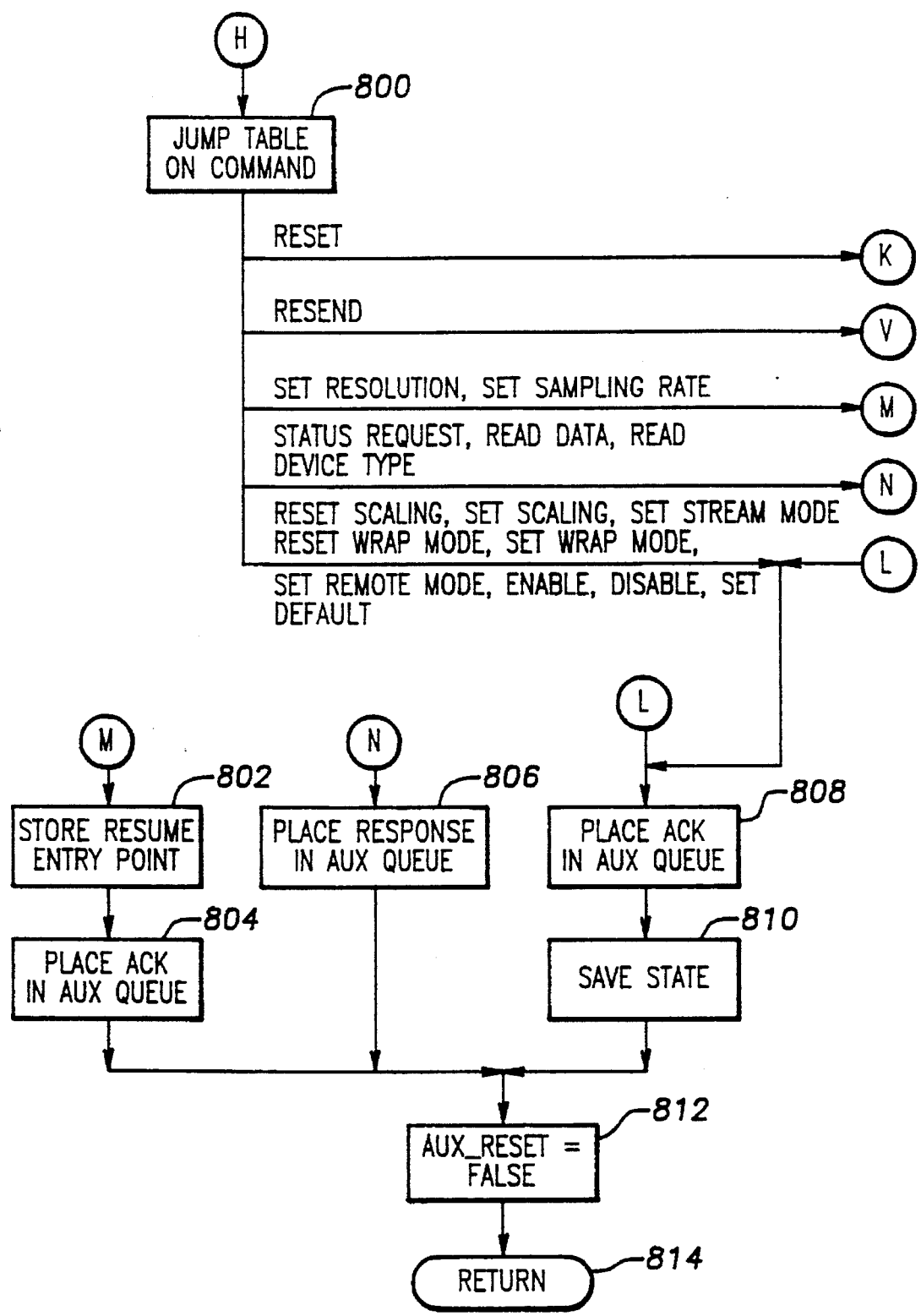

If at step 770 the AUX_EMULATE routine 550 determined that the data sent from the processor 10 through the I/O controller ASIC 32 was not a bad command character and was not data, it proceeds to step 800, shown in FIG. 18B. Step 800 indicates a jump table, which branches to various routines depending upon the command character the processor 10 sent to P_AUX. Certain commands require that the next data byte be handled by a resume command sequence as described in step 768, certain commands change the mouse configuration, and certain commands require a response to be sent to the processor 10. This branching is based on these requirements, although each of these commands may require other standard functions to be performed, which are not shown.

If the command is a set resolution command or a set sampling rate command, the AUX_EMULATE routine 750 proceeds to step 802, where it stores a resume routine entry point, as this is a two-byte command sequence, and then to step 804 where it places an acknowledgement response character in the auxiliary response data queue.

If the command is a status request command, read data command, or read device type command, the AUX_EMULATE routine 750 proceeds to step 806, where it places the appropriate response in the auxiliary response data queue. If the command was a status request command, this would entail responding with the 3-byte configuration status data, as is saved at step 810 and step 818 discussed below. This provides the system with the configuration status of the mouse, as saved by the emulation routine if no mouse is connected.

If the command is a reset scaling command, set scaling command, set stream mode command, reset wrap mode command, set wrap mode command, set remote mode command, enable command, disable command, or set default command, the AUX_EMULATE routine 750 proceeds to step 808, where it places an acknowledgement response character in the auxiliary response data queue and then to step 810 where it saves the configuration state as determined by the particular command. The state is saved in the 8751 controller 42 random access memory, and that state can then be provided by a status request command character sent to P_AUX, as shown at step 806.

From steps 804, 806, and 810, the AUX_EMULATE routine 750 proceeds to step 812, where it sets AUX_RESET to false, indicating the last command to P_AUX was not a reset, and returns at step 814.

If the command is a resend command, the AUX_EMULATE routine 750 proceeds from step 800 to 764, where it performs a resend function. If the command is a reset command at step 800, the AUX_EMULATE routine 750 proceeds to step 900 and executes a reset function as discussed below in conjunction with FIG. 18D.

Figure 18D:
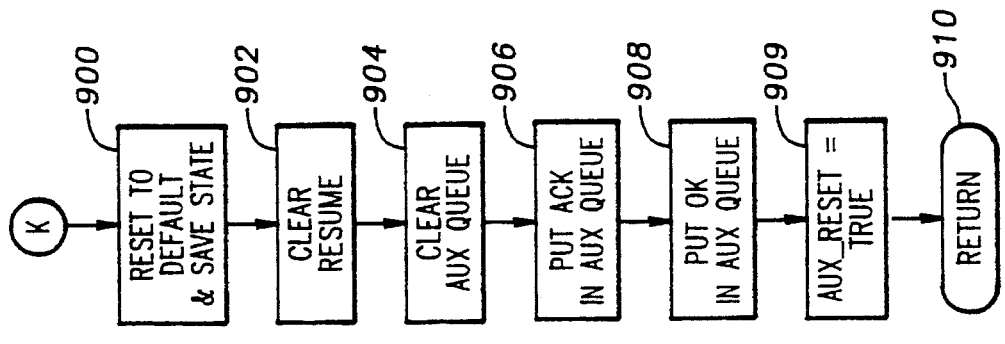
Figure 18C:
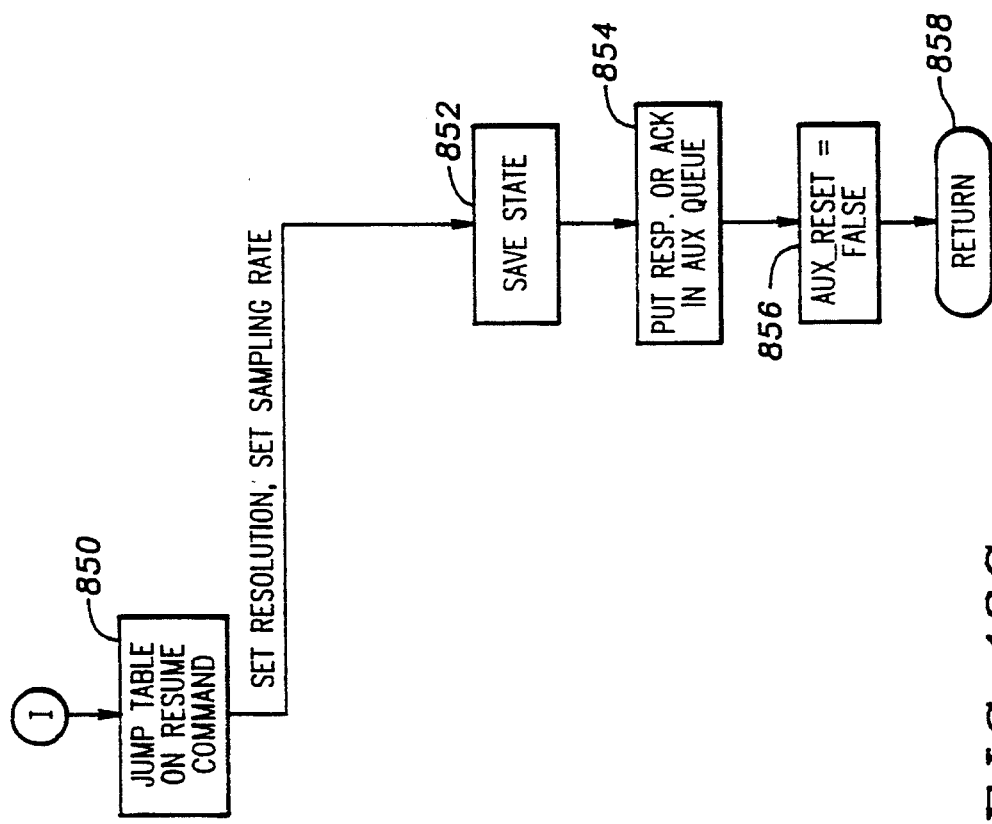

If at step 768 the AUX_EMULATE routine 750 determined it was in resume command sequence, it proceeds to step 850, shown in FIG. 18C. Step 850 indicates a jump table, which executes an appropriate jump based on the two byte command sequence that the AUX_EMULATE routine 550 has determined that it is in.

If the command sequence is a set resolution or set sampling rate command sequence, the AUX_EMULATE routine 750 proceeds from step 850 to step 852 where it saves the state according the particular command. Then at step 854, an appropriate response or acknowledgement is placed in the auxiliary response data queue. AUX_RESET is then set false at step 856, and the AUX_ENABLE routine 750 returns at step 858.

If a reset command is determined at step 754 or step 800, the AUX_EMULATE routine 750 proceeds to step 900 in FIG. 18D. In response to this command, it first resets to default conditions and saves the state at 900.

Then, at step 902, the AUX_EMULATE routine 750 clears any resume command sequence it may have previously been in, as a reset command cancels such a command sequence.

Continuing to step 904, the AUX_EMULATE routine 550 clears the auxiliary response data queue, at step 906 puts an acknowledgement response in the auxiliary response data queue, and at step 908 puts the auxiliary OK, OK response in the auxiliary response data queue. The AUX_EMULATE routine 750 then sets AUX_RESET true at a step 909 and returns at step 910.

As will be readily appreciated by one skilled in the art, a system constructed according to the invention provides numerous advantages by implementing the keyboard and mouse emulation routines. It allows a laptop or notebook system user to merely place their system in standby and then to switch connectors into which a keyboard and mouse are connected. When the system comes out of standby, the BIOS routines in conjunction with the 8751 controller 42 emulation routines detect the presence of a keyboard and mouse, appropriately map those devices to KBD and AUX correspondingly, and then allow normal execution to resume. Further, even though power was shutdown to the keyboard and mouse, thus saving power consumption, these devices will appear to be in the same state as when standby was entered. This is so whether or not the keyboard or mouse has been physically unplugged from the device, which would usually destroy this configuration data.

Further, on system start up, even if a keyboard or mouse is not installed, it can later be installed while in the standby state and become active upon leaving standby, as the operating system software will have been forced to install a keyboard and mouse driver because of the device emulation as implemented in the 8751 controller 42.

Although the described embodiment implements the keyboard and auxiliary control circuitry in the I/O controller ASIC 32 and the 8751 controller 42, one will appreciate that it could instead be implemented on a number of different chips or on a single chip. The principle of emulating device responses and capturing configuration data would remain the same.

It will be readily understood that such a system is not limited to a keyboard and mouse, but could be provided for any auxiliary device that is installed, powered up, and powered down during system operation. This is especially true with other types of pointing devices installed to respond to communications through P_AUX.

Although in the described embodiment the processor 10 retrieves and saves the configuration of the keyboard and mouse before shutdown, this data could of course be retrieved and saved elsewhere, such as in a separate ASIC, on disk, or in non-volatile memory or could just be retained in the 8751.

Further, although in the described embodiment the configuration data is captured by the 8751 keyboard controller 42, this could of course be done elsewhere, such as in the I/O controller ASIC 32, by the processor 10, or in other circuitry.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

APPENDIX A

This is the Technical Manual for the System/2 Mouse

See the 8042.TRG for additional information about the AUX device.

There are 4 modes of operation:

1. Reset
   a. self test begins upon power on or a reset command
   b. Completion code (AA) and ID (00) are sent to the system
      Defaults are:
      100 reports / sec
      linear scaling
      stream mode
      4 counts / mm
      disabled
   c. Failure initiates an error code (FC) and and id code (00)

2. Stream mode
   a. Data report is sent for each botton press
   b. report is sent if 1 or more motion count is detected 3. Remote
   a. data is sent in response to a data command 4. Wrap
   a. any data except EC or FF is sent back to the system The following is  list of valid commands:

E6  Reset Scaling
    This command sets mouse scaling to 1:1

E7  Set Scaling 2:1
    Input:          Output:
    0               0
    1               1
    2               1
    3               3
    4               6
    5               9
    N    >=6        2.0 x N E8  Set Resolution
    Second byte:    Resolution:
    00              1
    01              2
    02              4
    03              8

E9  Status Request
    3 bytes are as follows:     * First byte returned
                                  is FA (ACK).

+--+--+--+--+--+--+--+--+
    | 7| 6| 5| 4| 3| 2| 1| 0|
    +--+--+--+--+--+--+--+--+

Byte 1
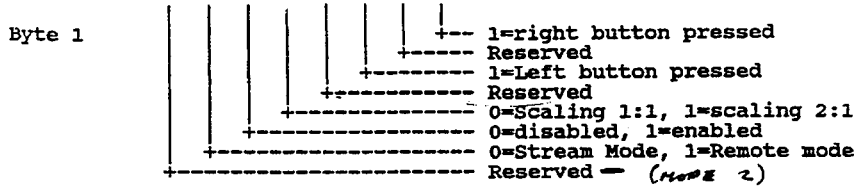
- 1=right button pressed
- Reserved
- 1=Left button pressed
- Reserved
- 0=Scaling 1:1, 1=scaling 2:1
- 0=disabled, 1=enabled
- 0=Stream Mode, 1=Remote mode
- Reserved — (Note 2)

Byte 2
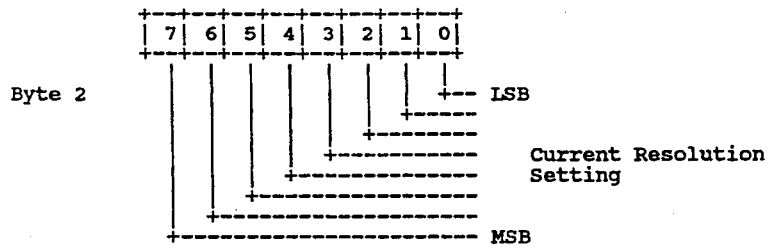
- LSB
- Current Resolution Setting
- MSB

Byte 3
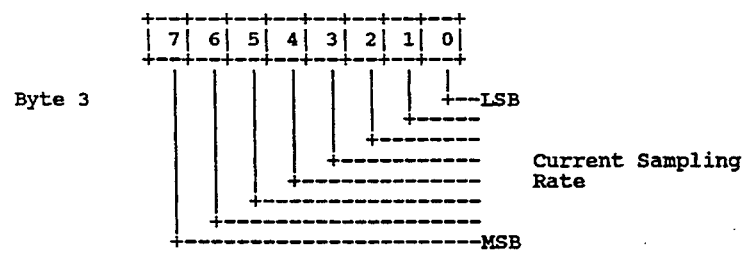
- LSB
- Current Sampling Rate
- MSB

EA Set Stream Mode
3 bytes are as follows:
This is also valid for the Remote Mode Byte 1
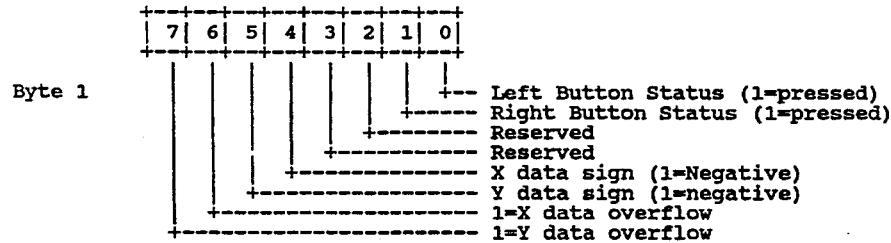
- Left Button Status (1=pressed)
- Right Button Status (1=pressed)
- Reserved
- Reserved
- X data sign (1=Negative)
- Y data sign (1=negative)
- 1=X data overflow
- 1=Y data overflow Byte 2
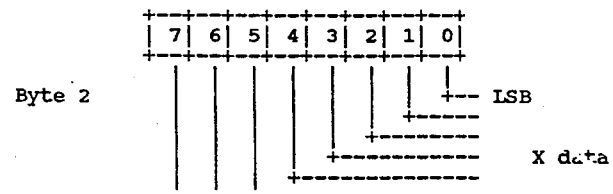
- LSB
- X data

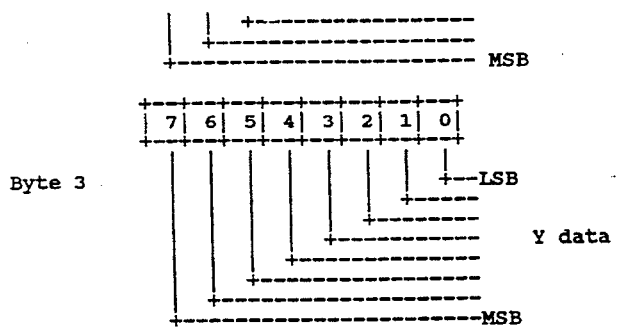

EB Read Data

EC Reset Wrap Mode
note: If the mouse is in Stream Mode and enters the Wrap Mode, the
      reset mode command will put the mouse in stream mode in a disabled state

•

EE Set Wrap Mode

F0 Set Remote Mode

•

F2 Read Device Type
Always receives a response of 00

F3 Set Sampling Rate
    Second byte:    Sample rate:

0A              10/sec
    14              20/sec
    28              40/sec
    3C              60/sec
    50              80/sec
    64              100/sec
    C8              200/sec F4 Enable F5 Disable F6 Set Default
•
•
•
•
•

FE Resend

FF Reset

Error Handling:
The mouse issues a resend command if it receives any invalid input or any input with incorrect polarity.
If two invalid inputsa re received in succession, the error code FC is sent
to the system
Following a system transmission, a response is sent within 25 mS if the
system requires a response of if an error is detected in the transmission
If the mouse is in Stream Mode, the system disables the mouse before issueing
any command requiring a response. When a command requiring a response is issued
by the system, another command shuld not be issued until either response is
received or 25 mS has elapsed. No more than 4 non response commands should be se
in succession.

Data Transmission:
During a data transmission, CLK is used to clock serial data. The Mouse
generates the clocking signal when sending data to and receiving from
the system. The system requests the mouse receive system data output by
forcing the DATA line to an inactive level and allowing CLK to go to an
active level.

Communication is bidirectional using the clock and data signal lines.
The signal for each of these lines is open collector allowing for
either the mouse or the system to force the line to the inactive level.
During a non transmission state, CLK and DATA are both held in an
active level.
Data Transmission:
When the mouse is ready to transmit data, it must first check its own
inhibit or system request to send status on the clock and data lines.
If CLK is low (inhibit status), data is continuously updated and no
transmissions are started. If CLK is High and DATA is Low (request to
send), data is updated. Data is received from the system and no
transmissions are started by the mouse until CLK and DATA are high.

If CLK and DATA are high, the mouse proceeds to output 0 start bit, 8
data bits, parity bit, and stop bit if a transmission is required. Data
is valid prior to the falling edge of CLK and beyond the rising edge of
CLK. During transmission, the mouse checks for line contention by
checking for an inactive level on CLK at intervals not to exceed
100uSec. Contention occurs when the system lowers CLK to inhibit the
mouse output after the mouse has started a transmission. If this occurs
before the rising edge of the 10th CLK (parity bit), the mouse
internally stores its data packet in its buffer and returns DATA and
CLK to an active level. If the contention does not occur by the 10th
clock, the transmission is complete.

Following a transmission, the system inhibits the mouse by holding CLK
low until it can service the input or until the system receives a
request to send or a response from the mouse. The system raises CLK to
allow the next transmission.

Data input:
When the system is ready to send data, it first checks to see if the
mouse is transmitting data. If the mouse is, the system can override
the output by forcing CLK to an inactive level prior to the 10th clock.
If the mouse transmission is beyond the 10th clock, the system
receives the data.

If the mouse is not transmitting, or if th system chooses to override
the output, the system forces CLK to an inactive level for a period not
less than 100 uSec while preparing for output. WHen the sysetm is ready
to output 0 (start bit) (data line is low), it allows CLK to go to an
active level. The mouse checks for this state not to exceed every
10mSec.

If request to send is detected, the mouse clocks in 11 bits. Following
the 10th clock, the mouse checks for an active level on the DATA line.

If found, the DATA line is forced low. (line control bit)and clocked once more.
This signals the system to return to the ready state when it can accept
input or go to the inhibit mode until ready. If data is found at an
inactive level following clock 10, a framing error has occurred and the
mouse continues to clock until DATA is high, then clocks the line
control bit and requests a resend.
For each system command or data transmissin that requires a response,
the system waits for the mouse to respond before sending its next
output. The response must be within 20 mSec, unless the system inhibits
the mouse output or inhibits the the data transmissions from the system
that require a response.

If the system initiates a command or data transmission and the response
is invalid, or has a parity error, the system retransmits the command
or data. if after two retries, the response is still invalid, or has a
parity error, the system resets the mouse.

Data Frame:
The data frame is as follows:

```
bit:            function:
start bit       Always 0
B0              lsb  \
B1-B6                 Data
B7                   /
Parity Bit      Odd Parity
Stop Bit        Always 1
```

Mouse driver interface:
The mouse driver is to be loaded from DOS and cannot be loaded from the config.s
Applications access the driver by issuing int 33hex. The device driver
determines which function to perform by the value in the AX register.
Parameters are passed from the calling application to the device driver
in the BX,CX,and DX registers. Function 16 also uses the SI and DI
regs. High level programming languages can access the device driver by
making a call to the entry point of the driver.

Far Call to Device Driver:
The device driver receives data from the mouse whenever the mouse is
moved or whenever a button position changes. During initial setup of
the mouse and the device driver, a pointer to a subroutine in the
device driver is passed to BIOS through Int 15h, AH=C2, AL=7. The
subroutine is called whenever mouse movement is detected or a button
position changes.

The following data is passed to the device driver subroutine on the
stack:

```
2 words         Return Address
1 word          Movement in Z direction (0)
1 word          Movement in Y direction
1 word          Movement in X direction
1 word          Status
```

The data is read from the stack and processed. While data is being
processed, no more data will be sent by the mouse BIOS. If a device
driver function is currently in progress, the data is lost.

Device Driver Functions (Int 15h) (Just the C2 part):

0000:0054    15  System Serveces (BIOS Extensions)

We claim:

1. A method of simulating user input device presence in a computer system including a processor, a first device port for coupling with a first external physical user input device, and controller circuitry for communicating device command and data characters between the processor and the first device port, the first external physical user input device being capable of assuming a configuration, the method comprising the steps of:

(a) determining whether the first external physical user input device is or is not coupled to the first device port;

(b) if at step (a) it was determined that the first external physical user input device is coupled to the first device port, performing the steps of (1) sending a device command or data character from the processor to the first device port, and (2) sending any device command or data character subsequently received from the first device port to the processor; and (c) if at step (a) it was determined that the first external physical user input device is not coupled to the first device port, performing the steps of (1) determining whether a device command or data character from the processor requires a response, (2) if a response was determined to be needed at step (c)(1), sending a device command or data character response from the controller circuitry to the processor, (3) determining whether the device command or data character from the processor is one of a predetermined number of commands intended to alter the configuration of the first external physical user input device, and (4) if it was determined at step (c)(3) that the device command or data character is intended to alter the configuration, saving the new configuration of the first external physical user input device.

2. The method of claim 1, wherein step (a) is performed when the computer system exits a predetermined state.

3. The method of claim 1, wherein the first external physical user input device is a keyboard.

4. The method of claim 1, wherein the first external physical user input device is a pointing device.

5. The method of claim 1, where the computer system also includes a second device port for coupling with a second external physical user input device, further comprising the step of:

after step (a), determining if a device command or data character is directed to the first device port or the second device port, and then performing steps (b) through c) using said determined first device port or second device port or sending responses as coming from said determined first device port or second device port.

6. The method of claim 5, wherein the first device port is intended to be coupled to a keyboard and the second device port is intended to be coupled to a pointing device.

7. The method of claim 1, wherein step (b) further comprising the steps of (3) determining whether the device command or data character sent to the first device port is one of a predetermined number of commands intended to alter the configuration of the first external physical user input device, and (4) if it was determined at step (b)(3) that the device command or data character is intended to alter the configuration, saving a new configuration of the first external physical user input device.

8. A method of preventing the loss of device configuration on standby in a computer system including a processor, a first device port capable of being powered down for coupling to a first physical user input device and controller circuitry for communicating between the processor and the first device port and for receiving device configuration command characters from the processor, the configuration command characters being suitable for altering the configuration of the first physical user input device, which in turn is configurable by the configuration command characters but is incapable of providing its configuration state to the controller circuitry, the method comprising the steps of:

(a) capturing in the computer system predetermined device configuration command characters directed to the first device port from the processor;

(b) saving in the computer system a device configuration state of the physical user input device as indicated by the device configuration command characters captured in step (a);

(c) powering down the device port;

(d) powering up the device port; and (e) resending said device configuration command characters responsive to the device configuration state saved in the computer system at step (b) to the first device port to restore the device configuration state to the physical user input device.

9. The method of claim 8, wherein step (b) includes the step of sending the device configuration state to the processor.

10. The method of claim 9, further comprising the steps of:

after step (c), powering down the controller circuitry and then powering up the controller circuitry.

11. The method of claim 8, where the computer further includes a second device port capable of being powered down for coupling to a second physical user input device, further comprising the steps of:

repeating steps (a) through (e) for the second device port and the second device port.

12. Controller circuitry for emulating device presence in a computer system with a processor for sending command and data characters, a bus, and a device port for an external device, the controller circuitry comprising:

means for communicating with the device port;

means for detecting whether an external device is responsive on the device port;

means for coupling the processor and said means for communicating with the device port when said means for detecting whether an external device is responsive indicates an external device is responsive; and means for emulating responses from an external device, said means responsive to command and data characters directed to the device port, said means for emulating including means for capturing, storing, and restoring an external device configuration responsive to command and data characters directed to the device port.

13. Controller circuitry for capturing device configuration of a physical user input device in a computer system with a processor for sending command and data characters, a bus, and a device port capable of powering down for a device, the command and data characters including configuration characters being suitable for altering the configuration of the physical user input device, which in turn is configurable by the configuration command characters but is incapable of providing its configuration state to the controller circuitry, the controller circuitry comprising:

means for capturing predetermined device configuration commands directed to the physical user input device through the device port;

means for saving device configuration data for the physical user input device responsive to said means for capturing the device configuration commands;

means for powering down and powering up the device port; and means for restoring the configuration of the physical user input device on the device port responsive to said means for saving device configuration data.

* * * * *